(12) United States Patent
Escammilla et al.

(10) Patent No.: US 12,523,648 B1
(45) Date of Patent: Jan. 13, 2026

(54) FLUORESCENT INDICATORS FOR CALCIUM METAL ION DETECTION

(71) Applicant: ION Biosciences, San Marcos, TX (US)

(72) Inventors: Pedro Rogelio Escammilla, San Marcos, TX (US); Jihyeon Lee, San Antonio, TX (US); Derek Scott Hernandez, Austin, TX (US)

(73) Assignee: ION Biosciences, San Marcos, TX (US)

( * ) Notice: Subject to any disclaimer, the term of this patent is extended or adjusted under 35 U.S.C. 154(b) by 0 days.

(21) Appl. No.: 19/208,155

(22) Filed: May 14, 2025

Related U.S. Application Data

(60) Provisional application No. 63/757,931, filed on Feb. 13, 2025.

(51) Int. Cl.
*G01N 33/52* (2006.01)
*G01N 33/20* (2019.01)

(52) U.S. Cl.
CPC ............ *G01N 33/52* (2013.01); *G01N 33/20* (2013.01); *G01N 2430/00* (2013.01)

(58) Field of Classification Search
CPC .... G01N 33/20; G01N 33/52; G01N 2430/00; Y10T 436/14; Y10T 436/142222; Y10T 436/17; Y10T 436/19; Y10T 436/20; Y10T 436/200833; Y10T 436/201666; Y10T 436/203332
USPC ..... 436/79, 91, 93, 106, 124, 127, 128, 129, 436/131, 164, 172; 422/82.08
See application file for complete search history.

(56) References Cited

U.S. PATENT DOCUMENTS

| | | | | |
|---|---|---|---|---|
| 4,603,209 A | * | 7/1986 | Tsien | A61P 5/00 |
| | | | | 546/171 |
| 4,849,362 A | * | 7/1989 | DeMarinis | C07D 403/06 |
| | | | | 548/312.1 |
| 5,049,673 A | * | 9/1991 | Tsien | G01N 33/84 |
| | | | | 546/261 |
| 5,516,911 A | * | 5/1996 | London | C07C 205/37 |
| | | | | 548/452 |
| 9,372,181 B2 | * | 6/2016 | Gee | C07D 311/90 |
| 9,810,700 B1 | | 11/2017 | Diwu et al. | |
| 2005/0233467 A1 | * | 10/2005 | Minta | C09B 11/24 |
| | | | | 436/166 |
| 2010/0167333 A1 | * | 7/2010 | Gee | C07D 209/14 |
| | | | | 549/392 |
| 2021/0054001 A1 | * | 2/2021 | Lavis | C07D 405/14 |
| 2024/0410907 A1 | * | 12/2024 | Liu | C07F 9/65681 |

OTHER PUBLICATIONS

Best et al. Organic and Biomoleuclar Chemistry, vol. 14, Apr. 7, 2016, pp. 5606-5611.*
Collot et al. Journal of the American Chemical Society, vol. 134, Jul. 20, 2012, pp. 14923-14931.*
He et al. Chinese Journal of Chemistry, vol. 27, 2009, pp. 1169-1173.*
Martin et al. Cell Calcium, vol. 36. 2004, pp. 509-514.*
Eberhard et al. European Journal of Biochemistry, vol. 202, 1991, pp. 1333-1338.*
Adams, S.R., et al., Biologically Useful Chelators that Release Ca2+ upon Illumination; Department of Physiology-Anatomy, University of California, Berkeley, Sep. 3, 1987.
Liss, Viktoria, et al., Self-Labelling Enzymes as Universal Tags for Fluorescence Microscopy, Super-Resolution Microscopy and Electron Microscopy; Scientific Reports; Dec. 8, 2025.
Los, Georgyi et al., HaloTag: A Novel Protein Labeling Technology for Cell Imaging and Protein Analysis; ACS Chemical Biology; vol. 3, No. 6, 2008.

* cited by examiner

*Primary Examiner* — Maureen Wallenhorst
(74) *Attorney, Agent, or Firm* — WOMBLE BOND DICKINSON (US) LLP; Ryan Cagle; Mark R. DeLuca

(57) ABSTRACT

The present disclosure describes compounds that can be used as $Ca^{2+}$ chelators and fluorescent calcium indicators. The compounds incorporate a cyclopentyl group in the calcium binding portion of the $Ca^{2+}$ fluorescent indicator. The indicators show substantially improved affinity for calcium ions in intracellular assays compared to other commercially available calcium selective fluorescent indicators.

30 Claims, 4 Drawing Sheets

FLUORESCENT INDICATORS FOR CALCIUM METAL ION DETECTION

TECHNICAL FIELD

The present invention is related to novel chelators for calcium ions. Fluorophores may be attached to the chelators to produce fluorescent indicators for calcium ion detection.

BACKGROUND

Metal ions play a crucial role in all life forms, as they are essential for vital processes, including metabolism and respiration. Cells utilize these ions for various functions, such as enzyme activity regulation, protein structure maintenance, cellular signaling, catalysis, polymer formation templates, and gene transcription regulation. However, deficient or excessive levels of metal ions can have detrimental effects.

Many natural and synthetic materials can selectively or non-selectively bind to or chelate metal ions. These ion chelators have many uses, including in vivo control of ionic concentrations and detoxification, in vitro buffers, and as optical indicators of ions when bound to a fluorophore. As optical indicators, they can be useful for analyzing cellular microenvironments and the dynamic properties of proteins, membranes, and nucleic acids.

Among metal ions, $Ca^{2+}$ ion plays an important role in many biological events, making the measurement of intracellular $Ca^{2+}$ an important biological tool for cell-based research and drug discovery. Improved fluorescent indicators that are selective for $Ca^{2+}$ metal ions remain of interest.

SUMMARY OF THE INVENTION

In an aspect of the disclosure, a calcium indicator has the chemical structure (I), or a salt thereof:

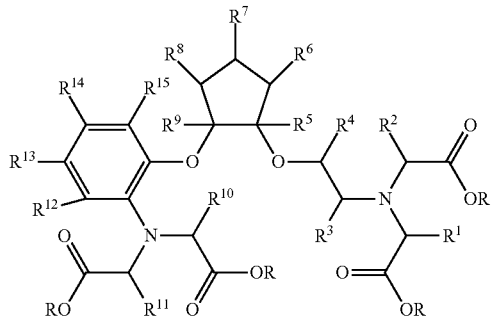

(I)

wherein:
R is H, a counter cation, an alkyl having 1-10 carbons, —Ac, or —CH$_2$OAc;
$R^1$-$R^{11}$ are independently H, a halogen, an alkyl, an aryl or a heteroaryl;
$R^{12}$-$R^{15}$ are independently H, an alkyl, a halogen, carboxy, carboxyalkylester, carboxyamide, an acyloxymethylcarbonyl, an alkoxy, an aryloxy, thiol, an alkylthiol, an arylthiol, azido, nitro, nitroso, cyano, an amino, hydroxy, a phosphonyl, a sulfonyl, a sulfonamide; a carbonyl, a boronyl, an aryl, a heteroaryl, a heterocycle or a fluorophore moiety.
or any two of $R^1$-$R^{11}$ are cyclically linked together;
or $R^{10}$ or $R^{11}$ are cyclically linked to $R^{12}$,
or $R^8$ or $R^9$ are cyclically linked to $R^{15}$.

In some aspects of the disclosure, at least one of $R^{12}$-$R^{15}$ is a fluorophore moiety or any two of $R^{12}$-$R^{15}$ are cyclically linked together to define a fluorophore moiety comprising a benzo-fused aryl, heteroaryl or heterocycle ring;

In some aspects of the disclosure, the fluorophore moiety is selected from an acridine, an acridone, an anthracene, a benzoisothiazole, a bodipy, a carbazole, a carboline, a coumarin, a chromone, a cyanine, a europium complex, a fluorene, a fluorescein, a furan, a furopyridine, a hemicyanine, an indole, an indoloquinolozine, an indolizine, an indolylidine, a naphthalimide, a naphthofluorescein, a naphthorhodamine, a naphthyridine, an oxadiazole, an oxatriazole, an oxazine, an oxazole, an oxazolopyridine, a perylenediimide, a phenanthroline, a phenazine, a phenothiazine, a phenoxazine, a phthalazine, a phthalocyanine, a pteridine, a purine, a pyranopyrrole, a pyrene, a pyridine, a pyridopyrimidine, a pyrimidine, a pyrylium, a quinoline, a quinolizine, a quinoxaline, a rhodamine, a rhodol, a ruthenium complex, a seminaphthofluorescein, a seminaphthorhodamine, a squaraine, a stirylpyridinium, a terbium complex, a thiadiazole, a thiazole, a thienopyridine, and a thiophene.

In an aspect of the disclosure, the fluorophore moiety is a xanthene fluorophore. For example, the fluorophore moiety can be a fluorescein fluorophore or a rhodamine fluorophore.

In an aspect of the disclosure, a calcium indicator has the chemical structure (IA), (IB), (IC), or (ID) or a salt thereof:

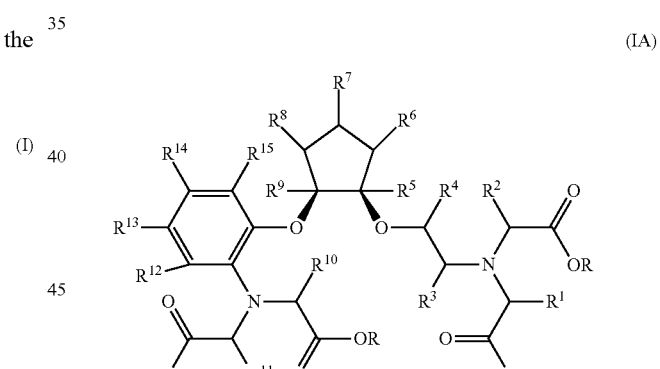

(IA)

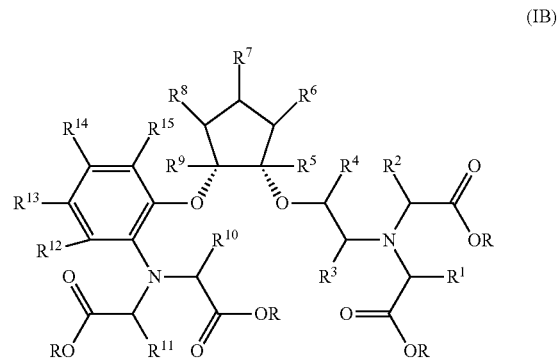

(IB)

(IC)

(ID)

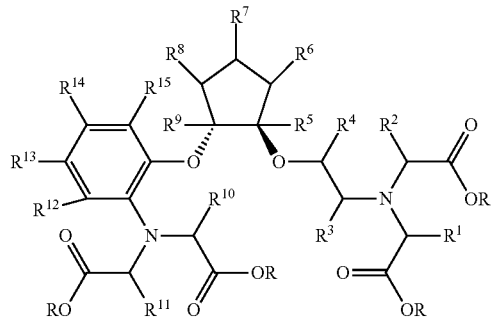

wherein $R^1$ to $R^{15}$ and R are the same as defined above with respect to chemical structure (I).

In an aspect of the disclosure, a calcium indicator has the chemical structure (IIA), (IIB), (IIC), or (IID), or a salt thereof:

(IIA)

(IIB)

(IIC)

(IID)

where:
  each R independently represents H, —Ac, —CH$_2$OAc, or a counter cation;
  R' is H, —Ac, —CH$_2$OAc, or a counter cation; and
  each X independently represents H, F, Br, or Cl.

Compounds (IIA), (IIB), (IIC), and (IID) can exist in their respective tautomeric forms.

In some aspects of the present disclosure, R is —CH$_2$OAc and X is F. In some aspects of the present disclosure, R is a counter cation and X is F. The counter cation can be an ammonium salt of a metal cation. Exemplary cations include ammonium salts or metal cations. Examples of ammonium salts include, but are not limited to, Me$_4$N$^+$ or H$_4$N$^+$. Metal cations can include alkali metal cations or alkaline earth metal cations. Examples of metal cations include, but are not limited to, K$^+$ or Na$^+$.

In an aspect of the disclosure, a calcium indicator has the chemical structure (IIIA), (IIIB), (IIIC) or (IIID), or a salt thereof:

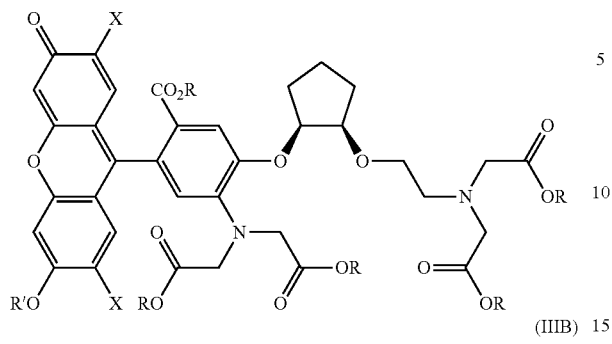
(IIIA)

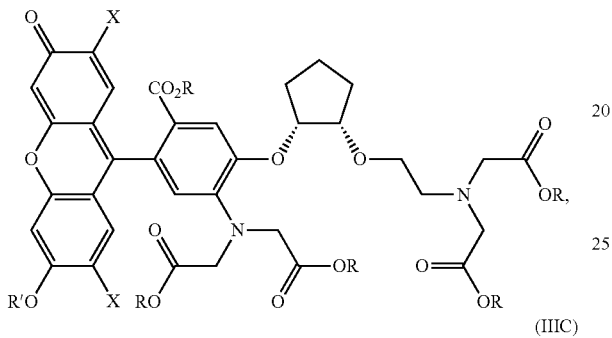
(IIIB)

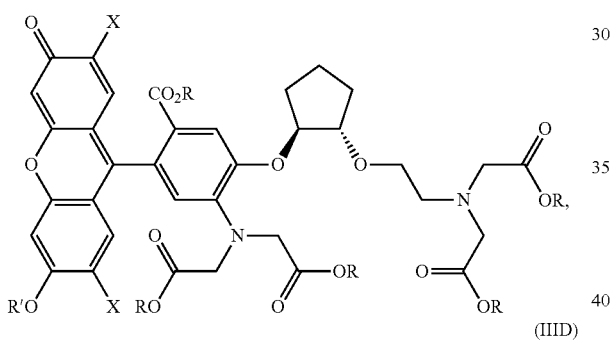
(IIIC)

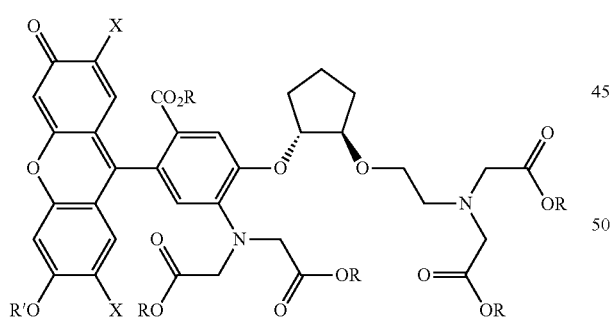
(IIID)

where:
each R independently represents H, —Ac, —CH$_2$OAc, or a counter cation;
each X independently represent H, F, Br, or Cl.

Compounds (IIIA), (IIIB), (IIIC), and (IIID) can exist in their respective tautomeric forms.

In some aspects of the present disclosure, R is —CH$_2$OAc and X is F. In some aspects of the present disclosure, R is a counter cation and X is F. The counter cation can be an ammonium salt of a metal cation. Exemplary cations include ammonium salts or metal cations. Examples of ammonium salts include, but are not limited to, Me$_4$N$^+$ or H$_4$N$^+$. Metal cations can include alkali metal cations or alkaline earth metal cations. Examples of metal cations include, but are not limited to, K$^+$ or Na$^+$.

Specific examples of compounds of the present disclosure include:

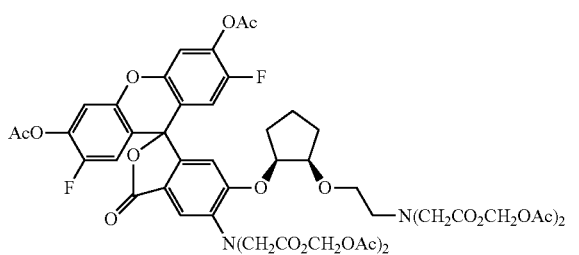
(IIA-3)

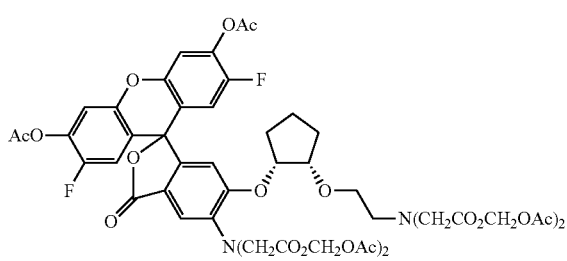
(IIB-3)

Specific examples of compounds of the present disclosure include:

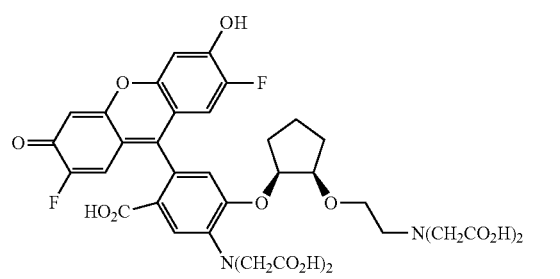
(IIA-4)

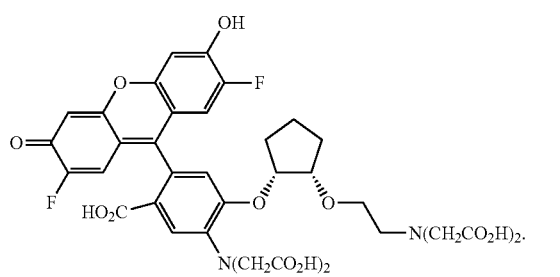
(IIB-4)

Specific examples of compounds of the present disclosure include:

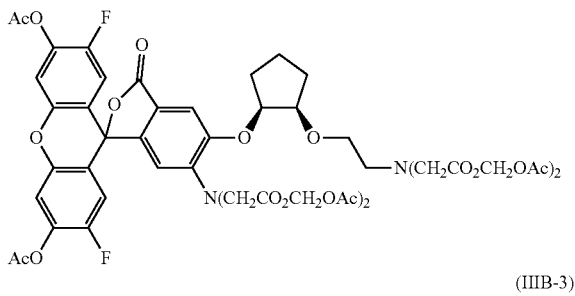

(IIIA-3)

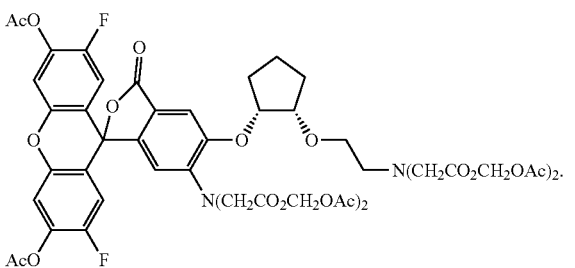

(IIIB-3)

Specific examples of compounds of the present disclosure include:

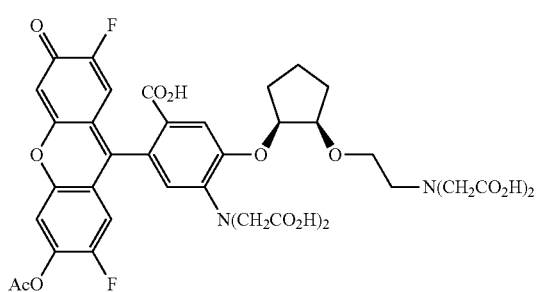

(IIIA-4)

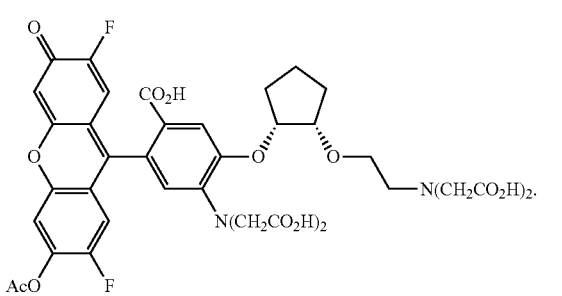

(IIIB-4)

BRIEF DESCRIPTION OF THE DRAWINGS

Advantages of the present invention will become apparent to those skilled in the art with the benefit of the following detailed description of embodiments and upon reference to the accompanying drawings in which.

DETAILED DESCRIPTION

Figure 1:
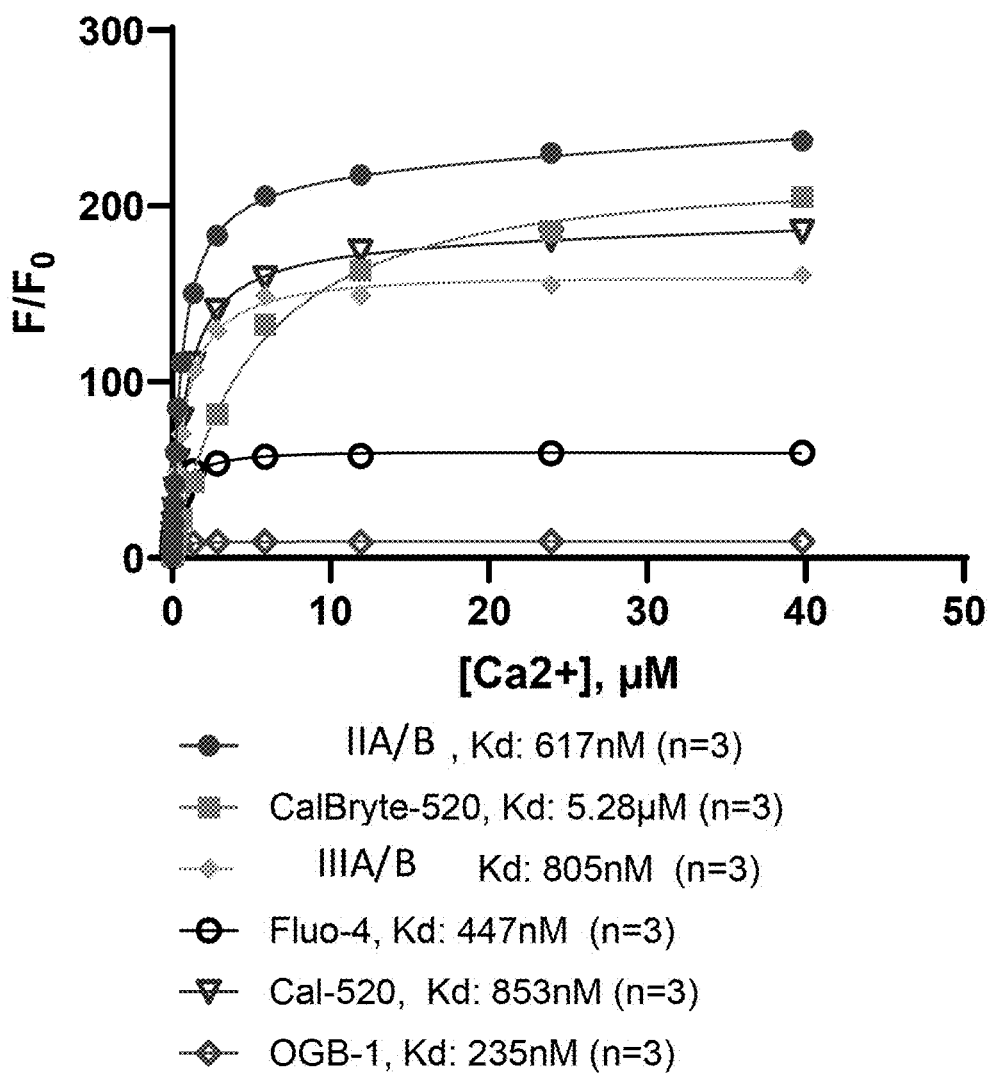
FIG. 1 depicts a $Ca^{2+}$ titration curve of the normalized fluorescence of the $Ca^{2+}$ fluorescent indicators IIA/B and IIIA/B (R=K$^+$, X=F), of the present invention, to commercial fluorescent calcium indicators at $Ca^{2+}$ concentrations of 0 to 50 PM.

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The following definitions are set forth to illustrate and define the meaning and scope of the various terms used to describe the invention herein.

Within certain bonding models, a chemical bond between two atoms may be homolyzed, wherein each pair of electrons forming a bond between the two atoms is split so that each atom retains one of the electrons from the pair. Two covalently bonded atoms may share one (single bond), two (double bond), or three (triple bond) pairs of electrons. Within this model, each atom can be considered a "radical" contributing one, two, or three electrons to the bond with the other atom. As used herein a "substituent" refers to a radical that contributes one, two, or three electrons to form a single, double, or triple covalent bond with another atom.

The terms "alkyl" and "alkyl group", as used herein, refers to straight, branched-chain, or cyclic hydrocarbon radicals. Examples of alkyl groups, include, but are not limited to methyl, ethyl, propyl, cyclopropyl, isopropyl, butyl, t-butyl, and isobutyl. As used herein the term "lower alkyl" refers to an alkyl residue having from 1-6 carbon atoms. The term "substituted alkyl" as used herein generally refers to alkyl groups that include one or more functional groups attached to any carbon of the alkyl group.

The term "substituted," as used herein, refers to the formal replacement of a hydrogen on a substituent with a functional group. Functional groups that can be used in substituted radicals include, but are not limited to, hydroxy, oxo, nitro, trifluoromethyl, halogen, alkoxy, alkylenedioxy, aminoalkyl, aminoalkoxy, amino, monoalkylamino, dialkylamino, alkylcarbonylamino, alkoxycarbonylamino, alkoxycarbonyl, carboxy, hydroxyalkoxy, alkoxyalkoxy, monoalkylaminoalkoxy, dialkylaminoalkoxymono(carboxyalkyl) amino, bis(carboxy-alkyl)amino, alkoxycarbonyl, alkynylcarbonyl, alkylsulfonyl, alkenylsulfonyl, alkynylsulfonyl, arylsulfonyl, alkylsulfinyl, alkylsulfonamido, arylsulfonamido, carboxyalkoxy, carboxyalkyl, carboxyalkylamino, cyano, trifluoromethoxy, perfluoroethoxy, guanidine, amidino, oxyguanidino, alkylimino, formylimino, acyl nitrile, acyl azide, acetyl azide, dichlorotriazene, isothiocyanate, sulfonyl halide, sulfosuccinimidyl ester, isocyante, acyl halide, aldehyde, haloacetamide, maleimido, aziridinyl, alkylthio (disulfide), acrylo, haloalkylcarbonyl, boronate, hydrazide, semicarbazide, carbohydrazide, arylalkyl, heteroarylalkyl, cycloalkylalkyl, cycloalkenylalkyl, cycloheteroalkylalkyl, and cycloheteroalkenylalkyl. In some embodiments, a group that is substituted has 1, 2, 3, or 4 substituents, 1, 2, or 3 substituents, 1 or 2 substituents, or 1 substituent. It should be understood that substituted substituents do not contain any substitution or substitution patterns which are sterically impractical and/or synthetically non-feasible. In addition, the subject compounds include all stereochemical isomers arising from the substitution of these compounds.

The term "alkylene" as used herein, refers to straight or branched-chain divalent hydrocarbon radicals. Examples of alkylene groups, include, but are not limited to methylene ($-CH_2-$), ethylene ($-CH_2CH_2-$), propylene, and butylene.

The terms "alkenyl" and "alkenyl group" as used herein, refers to straight, branched-chain, or cyclic hydrocarbon radicals that have at least one carbon-carbon double bond.

Examples of alkenyl groups, include, but are not limited to ethenyl, 1-propenyl, 2-propenyl, 2-methyl-1-propenyl, 1-butenyl, and 2-butenyl. The term "substituted alkenyl" as used herein generally refers to alkenyl groups that include one or more functional groups attached to any carbon of the alkenyl group.

The term "alkenylene, as used herein, refers to straight, branched-chain, or cyclic hydrocarbon diradicals that have at least one carbon-carbon double bond. Examples of alkenylene groups, include, but are not limited to ethenylene ($-CH=CH-$), propenylene ($-CH=CHCH_2-$ and $-CH_2CH=CH-$), n-butenylene, and 3-methyl-2-pentenylene. The term "substituted alkynyl" as used herein generally refers to alkynyl groups that include one or more functional groups attached to any carbon of the alkynyl group.

The terms "alkynyl" and "alkynyl group" as used herein, refers to straight, branched-chain, or cyclic hydrocarbon radicals that have at least one carbon-carbon triple bond. Examples of alkynyl groups, include, but are not limited to acetylenyl, 1-propynyl, and 2-propynyl.

The term "alkynylene" as used herein, refers to straight, branched-chain, or cyclic hydrocarbon diradicals that have at least one carbon-carbon triple bond. Examples of alkenylene groups, include, but are not limited to ethynylene ($-C\equiv C-$), propynylene ($-C\equiv CCH_2-$ and $-CH_2C\equiv C-$), n-butynylene, 4-methyl-2-pentynylene, 1-butynylene, 2-butynylene, 3-butynylene, 4-butynylene.

The terms "alkoxy" or "alkoxy group" as used herein refers to an oxygen radical linked to an alkyl group. Examples of alkoxy groups include, including but not limited to methoxy, ethoxy, isopropyloxy, sec-butyloxy, n-butyloxy, t-butyloxy, n-pentyloxy, 2-methylbutyloxy, 3-methylbutyloxy, n-hexyloxy, and 2-ethylbutyloxy.

The term "aryl" or "aryl group", as used herein refers to an aromatic substituent which may be a single ring or multiple rings which are fused together, linked covalently, or linked to a common group such as an alkylene moiety. Aryl groups include but are not limited to phenyl, naphthyl, biphenyl, diphenylmethyl, and 2,2-diphenyl-1-ethyl. An aryl group can be substituted with substituents including, but not limited to, alkyl groups, halogen atoms, nitro groups, carboxyl groups, and alkoxy groups to give a "substituted aryl group." Substituents can be attached at any position on the aryl group which would otherwise be occupied by a hydrogen atom.

The term "heterocycle" as used herein generally refers to a stable 5- to 7-membered monocyclic or bicyclic or 7- to 10-membered bicyclic heterocyclic ring which is either saturated or unsaturated, and which consists of carbon atoms and from 1 to 4 heteroatoms (e.g., N, O, and S) and wherein the nitrogen and sulfur heteroatoms may optionally be oxidized, and the nitrogen may optionally be quaternized, and including any bicyclic group in which any of the above-defined heterocyclic rings is fused to a benzene ring. The term heterocycle encompasses aromatic compounds and non-aromatic compounds. Aromatic heterocycles are also referred to herein as a "heteroaryl" or "heteroaryl group". Examples of heteroaryl groups include, but are not limited to, thiophene, pyridine, isoxazole, phthalimide, pyrazole, indole, furan, or benzo-fused analogs of these rings. Examples of non-aromatic heterocycles include, but are not limited to, tetrahydrofuran, morpholine, piperidine, and pyrrolidine. A heterocyclic can be attached to another group (such as an alkyl group or an aryl group) at any heteroatom or carbon atom that results in a stable structure. A heterocycle can be substituted on carbon or on a heteroatom to give a "substituted heterocycle group." Substituents may be attached at any position on the heterocycle group which would otherwise be occupied by a hydrogen atom and create a stable molecule.

The terms "halogen" or "halo" as employed herein, by itself or as part of another group, refers to chlorine, bromine, fluorine or iodine.

The terms "amino" or "amine", as used herein, include $NH_2$, monoalkylamine, and dialkylamine. The term "monoalkylamine" as used herein refers to the group $NH_2$ where one hydrogen has been replaced by an alkyl group. The term "dialkylamine" as used herein refers to the group $NH_2$ where each hydrogen has been individually replaced by an alkyl group, for a total of two individual alkyl groups attached to the amine nitrogen.

The term "hydroxyalkyl," as used herein, refers to an alkyl group where one or more hydrogens thereof are substituted by one or more hydroxyl moieties.

The term "haloalkyl," as used herein, refers to an alkyl group where one or more hydrogens thereof are substituted by one or more halo moieties. Typical examples include chloromethyl, fluoromethyl, difluoromethyl, trifluoromethyl, trichloroethyl, trifluoroethyl, fluoropropyl, and bromobutyl, among others.

The terms "carboxy" and "carboxy group", as used herein, refer to a carboxylic acid group.

The term "carboxyalkylester", as used herein, refers to an alkyl ester of a carboxy group.

The term "carboxyamide", as used herein, refers to an amide of a carboxy group. The amide can be a primary amide, a secondary amide or a tertiary amide.

The term "carboxyalkyl," as employed herein, refers to an alkyl group where one or more hydrogens thereof are substituted by one or more carboxylic acid moieties.

The terms "chelator", "chelate", or "chelating group" as used herein, refers to a chemical moiety that binds to, or complexes with, one or more metal ions. In preferred embodiments of the present disclosure the chelator binds to calcium ions.

The term "fluorophore" or "fluorophore moiety" as used herein, by itself or as part of another group, means a molecule or a portion of a molecule which exhibits fluorescence. By fluorescence is meant that the molecule or portion of a molecule can absorb excitation energy having a given wavelength and emit energy at a different wavelength. The intensity and wavelength of the emitted energy depend on the fluorophore, the chemical environment of the fluorophore, and the specific excitation energy used. Exemplary fluorophores include, but are not limited to, xanthenes, fluoresceins, rhodamines, coumarins, oxazines, cyanines, pyrenes, and other polycyclic aromatic molecules.

The term "xanthene" or "xanthene based compounds", as used herein, means any compounds or substituents that contain one or more of the following fused ring structures or its derivatives:

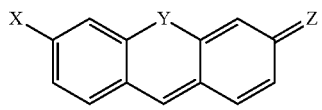

Xanthene-based compounds
(X, Z is O, S, Se, or N; Y is O, S, Se, N, P, C, B, or Si)

The term "fluorescein" or "fluorescein based compounds" as used herein, means any compounds or substituents that contain one or more of the following fused ring structures or its derivatives:

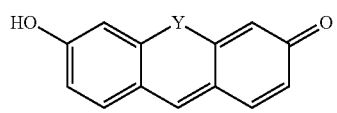

Fluorescein-based compounds
(Y is O, S, Se, N, P, C, B, or Si)

The term "rhodamine" or "rhodamine based compounds" as used herein, means any compounds or substituents that contain one or more of the following fused ring structures or its derivatives:

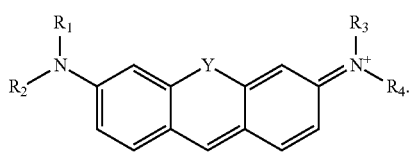

(Y is O, S, Se, N, P, C, B, or Si)

The terms "AM ester" or "AM" as employed herein, by itself or as part of another group, refers to an acetoxymethyl ester of a carboxylic acid or a phenol.

The term "indicator" refers to a dye or dye moiety that exhibits a change in a spectroscopic property in the presence of a target analyte. The term "indicator compound" refers to the compounds of the present disclosure, specifically to those compounds having utility as fluorescent calcium ion indicators, as well as their acylated or otherwise protected fluorogenic precursor compounds, such as the acetoxymethyl ester derivatives suitable for adding to samples containing biological cells.

The term "fluorophore" refers to a dye, dye moiety or compound that is capable of demonstrating a change in fluorescence upon interaction with a target analyte of interest. The fluorophore can have a first fluorescent form in the absence of target analyte and is capable of being converted to a second fluorescent form in the presence of target analyte. The conversion of the fluorophore to a fluorescent dye product (i.e., conversion from a first to a second fluorescent state, e.g., as described herein) can be achieved via direct or indirect action of the target analyte on the fluorophore. The first and second fluorescent form of the dye refers to chemical or physical forms of the dye compounds. The term "chemical form" refers to the chemical structure of a molecule, where the first and second forms of a fluorophore involve distinct chemical structures which can have different spectral properties. The term "physical form" is meant to encompass a variety of different physical forms of a molecule having identical chemical structure, but having different spectral properties due to the molecule being in a, e.g., different electronic state, a different steric state, or a different physical environment, such as an analyte bound form or an unbound form.

In certain instances, the fluorophore is substantially non-fluorescent in the absence of target analyte. In some cases, the fluorophore is ratiometric. The term "ratiometric" refers to a fluorescent indicator for a target analyte where the ratio of the intensities of the fluorescence excitation or emission signals is proportional to the amount of target analyte that is present. As such, measurement of the fluorescence signals can be used to quantitate the amount of target analyte that is present in the composition.

The present disclosure describes calcium chelators and fluorescent indicators for calcium ions. Such indicators show improved affinity for calcium ions in intracellular assays compared to other commercially available calcium selective fluorescent indicators. Additionally, the fluorescent indicators of the present disclosure exhibit the largest and the brightest response to calcium ions compared to other commercially available calcium selective fluorescent indicators.

The additional brightness gained as a result of the increased binding affinity (3X brighter in intracellular basal fluorescence signal) and large signal increase coupled to calcium mobilization enables no wash assay formats without the use of extracellular masking reagents.

In an aspect of the disclosure, a calcium indicator has the chemical structure (I), or a salt thereof:

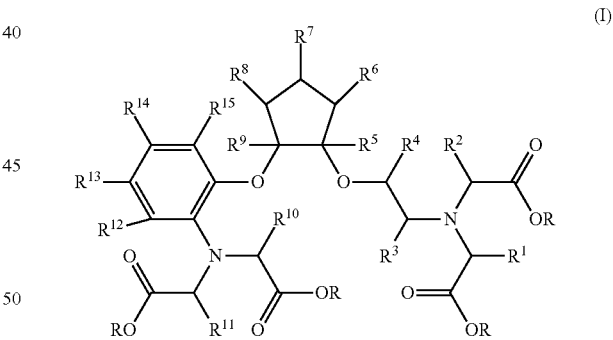

(I)

wherein:
$R^1$-$R^{11}$ are independently H, a halogen, an alkyl, an aryl or a heteroaryl;
R is H, a counter cation, an alkyl having 1-10 carbons, or —$CH_2OAc$;
$R^{12}$-$R^{15}$ are independently H, an alkyl, a halogen, carboxy, carboxyalkylester, carboxyamide, an acyloxymethylcarbonyl, an alkoxy, an aryloxy, a thiol, an alkylthiol, an arylthiol, an azido, a nitro, a nitroso, a cyano, an amino, a hydroxy, a phosphonyl, a sulfonyl, a sulfonamide, a carbonyl, a boronyl, an aryl, a heteroaryl, a heterocycle or a fluorophore moiety;
or any two of $R^1$-$R^{11}$ are cyclically linked together;
or $R^{10}$ or $R^{11}$ are cyclically linked to $R^{12}$,
or $R^8$ or $R^9$ are cyclically linked to $R^{15}$.

In some aspects of the disclosure, at least one of $R^9$-$R^{12}$ is a fluorophore moiety or any two of $R^9$-$R^{15}$ are cyclically linked together to define a fluorophore moiety comprising a benzo-fused aryl, heteroaryl, or heterocycle ring.

In some aspects of the disclosure, the fluorophore moiety is selected from an acridine, an acridone, an anthracene, a benzoisothiazole, a bodipy, a carbazole, a carboline, a coumarin, a chromone, a cyanine, a europium complex, a fluorene, a fluorescein, a furan, a furopyridine, a hemicyanine, an indole, an indoloquinolozine, an indolizine, an indolylidine, a naphthalimide, a naphthofluorescein, a naphthorhodamine, a naphthyridine, an oxadiazole, an oxatriazole, an oxazine, an oxazole, an oxazolopyridine, a perylenediimide, a phenanthroline, a phenazine, a phenothiazine, a phenoxazine, a phthalazine, a phthalocyanine, a pteridine, a purine, a pyranopyrrole, a pyrene, a pyridine, a pyridopyrimidine, a pyrimidine, a pyrylium, a quinoline, a quinolizine, a quinoxaline, a rhodamine, a rhodol, a ruthenium complex, a seminaphthofluorescein, a seminaphthorhodamine, a squaraine, a stirylpyridinium, a terbium complex, a thiadiazole, a thiazole, a thienopyridine, and a thiophene.

The fluorophore moiety can be any compound that exhibits or changes fluorescence when a metal ion is bound to the metal ion chelating component. In a preferred embodiment, the fluorophore moiety is a xanthene fluorophore. Examples of xanthene fluorophores include fluorescein fluorophores or rhodamine fluorophores.

Xanthene fluorophores useful in the present disclosure include fluorescence compounds having the general structure (FC-1):

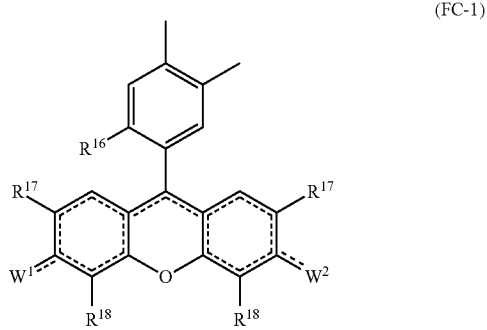

(FC-1)

where:

$R^{16}$ is H, Me, $COR^{19}$, $SO_2R^{19}$;

$R^{19}$ is H, alkyl, —OH, —O-counter cation, —OAlkyl, —N($R^{21}$)$_2$;

each $R^{21}$ is independently H or alkyl each $R^{17}$ and $R^{18}$ independently represent H, F, or Cl;

each $W^1$ and $W^2$ independently represent O, OH, OAc, OAlkyl, or —N($R^{20}$)$_2$.

In the structures set forth in this application the use of a dashed line [- - -] in the structures denotes that the bond can be either a single bond or a double bond. Specific examples of xanthene fluorescence compounds include the compounds set forth in Table 1.

TABLE 1

| Common Name | $R^{16}$ | $R^{17}$ | $R^{18}$ | $W^1$ | $W^2$ |
|---|---|---|---|---|---|
| Fluorescein | $CO_2H$ | H | H | OH | O |
| Rhodamine B | $CO_2H$ | H | H | N(Et)$_2$ | N(Et)$_2$ |
| Rhodol | $CO_2H$ | H | H | NR$_2$ (R is H or Alkyl) | OH |
| Fluo-4 | H | F | H | OH | O |
| Tokyo Green | Me | H | H | OH | O |
| Pennsylvania Green | Me | F | H | OH | O |
| Oregon Green | $CO_2H$ | F | H | OH | O |

Many xanthene fluorophores can exist in tautomeric forms. The specific tautomeric form adopted by the xanthene dye can depend on the solution conditions that the compound is exposed to (e.g., pH). For example, for fluorescein and similar xanthene fluorophore compounds having a carboxylic acid group in the $R^{16}$ position (e.g., Oregon Green), the fluorophores can exist in either an open form (FC-2) or a spirolactone form (FC-3).

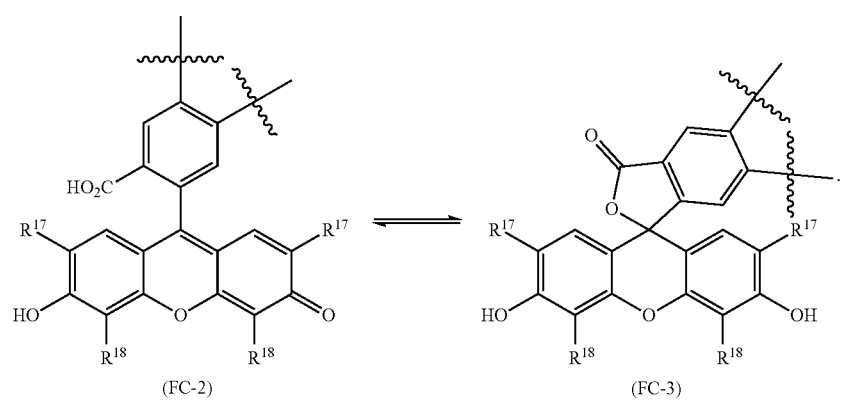

(FC-2)    (FC-3)

Xanthene fluorophores having an amine group in the $W^1$ and/or the $W^2$ position, such as rhodamine B, and a carboxylic group in the $R^{16}$ position, can exist in either an open form (FC-4), (FC-6) or a spirolactone form (FC-5), (FC-7).

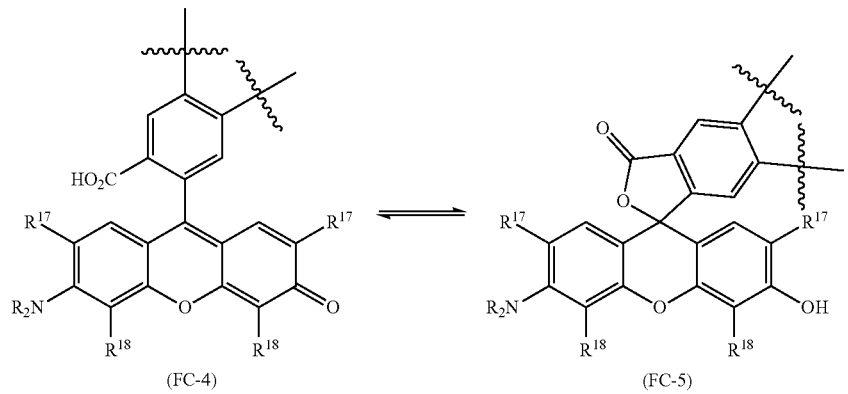

(FC-4)  (FC-5)

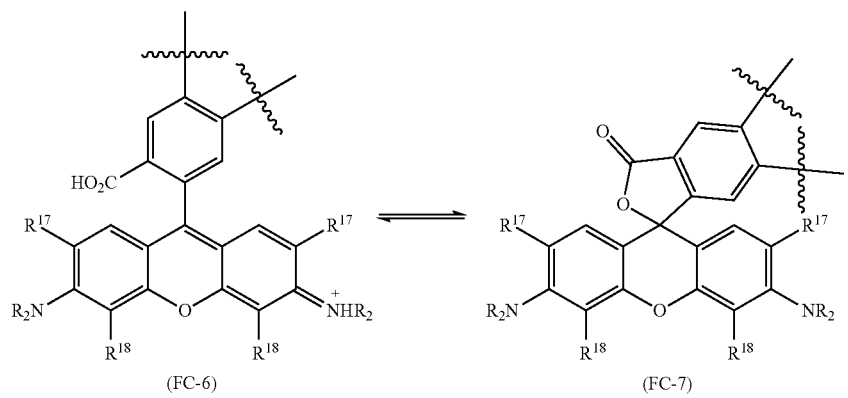

(FC-6)  (FC-7)

Throughout the specification, for readability and efficiency of describing the fluorophores, only one of the various tautomeric chemical structures will be displayed. However, it should be understood that the non-displayed tautomeric chemical structure is also encompassed by the displayed chemical structure.

In an aspect of the disclosure, a calcium indicator has the chemical structure (IIA), (IIB), (IIC), or (IID), or a salt thereof:

-continued

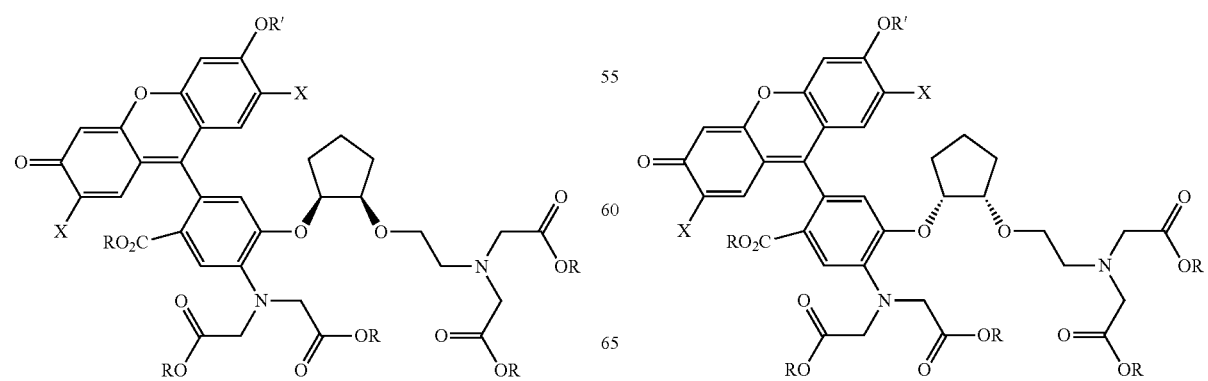

(IIA)  (IIB)

(IIC)

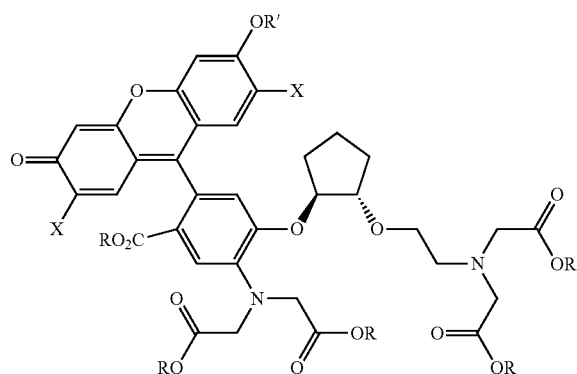

(IID)

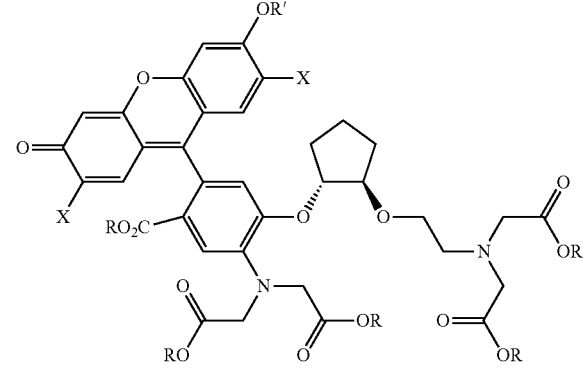

where:
each R independently represents H, —Ac, —CH$_2$OAc, or a counter cation;
R' is H, —Ac, —CH$_2$OAc, or a counter cation;
each X independently represents H, F, Br, or Cl.

In some aspects of the present disclosure, the Compound (IIA) can exist in the following tautomeric forms:

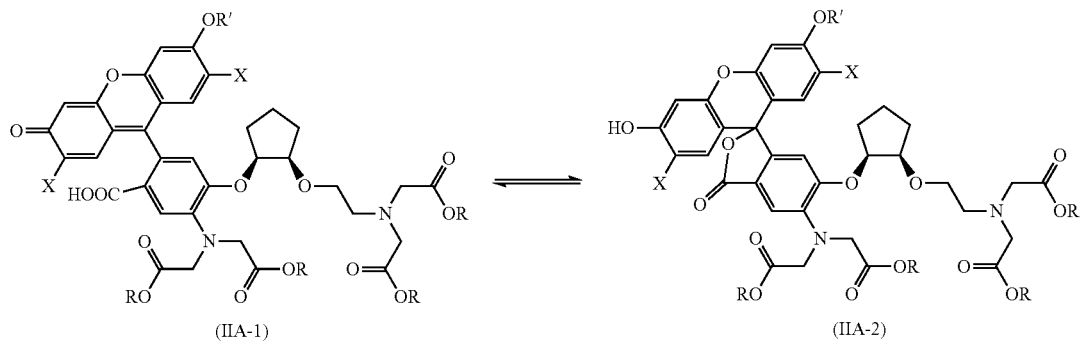

(IIA-1)　　　　　　　　　　　　(IIA-2)

each R independently represents H, —Ac, —CH$_2$OAc, or a counter cation;
R' is H, —Ac, —CH$_2$OAc, or a counter cation; and
each X independently represent H, F, Br, or Cl.

In some aspects of the present disclosure, the Compound (IIB) can exist in the following tautomeric forms:

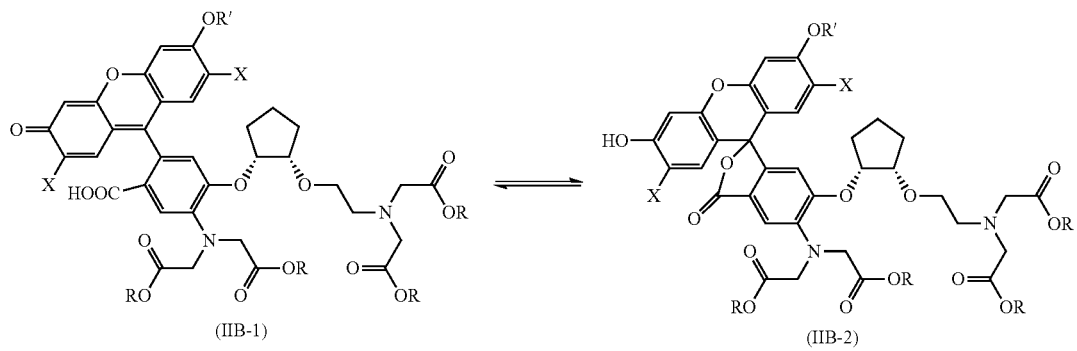

(IIB-1)　　　　　　　　　　　　(IIB-2)

each R independently represents H, —Ac, —CH$_2$OAc, or a counter cation;
R' is H, —Ac, —CH$_2$OAc, or a counter cation; and
each X independently represent H, F, Br, or Cl.

In some aspects of the present disclosure, the Compound (IIC) can exist in the following tautomeric forms:

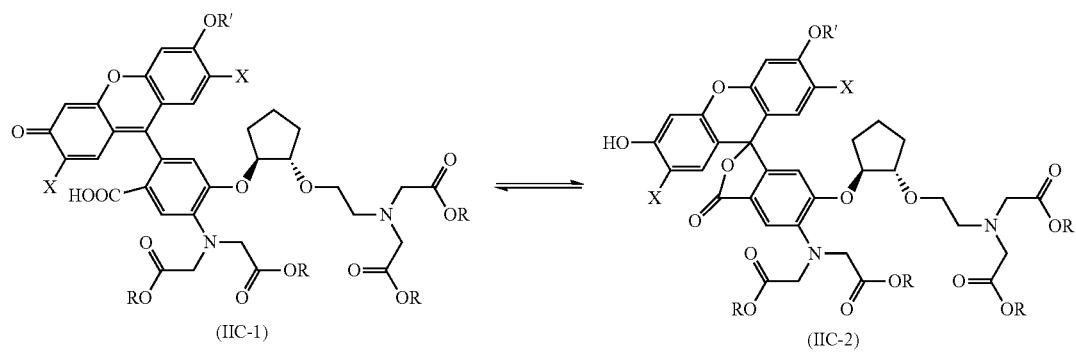

(IIC-1)    (IIC-2)

each R independently represents H, —Ac, —CH$_2$OAc, or a counter cation;
R' is H, —Ac, —CH$_2$OAc, or a counter cation; and
each X independently represent H, F, Br, or Cl.

In some aspects of the present disclosure, the Compound (IID) can exist in the following tautomeric forms:

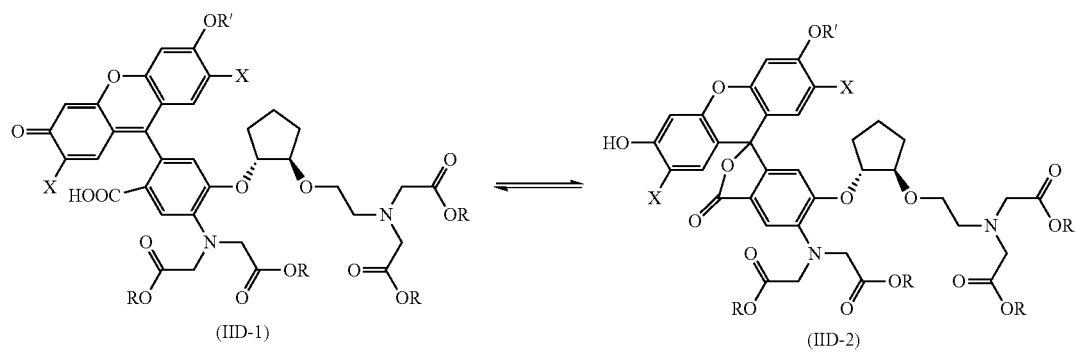

(IID-1)    (IID-2)

each R independently represents H, —Ac, —CH$_2$OAc, or a counter cation;
R' is H, —Ac, —CH$_2$OAc, or a counter cation; and
each X independently represent H, F, Br, or Cl.

Two exemplary compounds having the chemical structure of compounds (IIA) and (IIB) are:

-continued

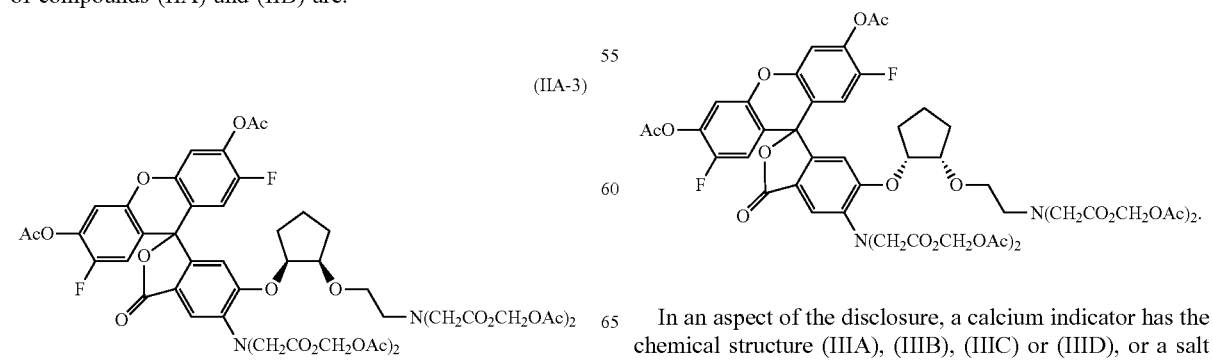

(IIA-3)    (IIB-3)

In an aspect of the disclosure, a calcium indicator has the chemical structure (IIIA), (IIIB), (IIIC) or (IIID), or a salt thereof:

(IIIA)

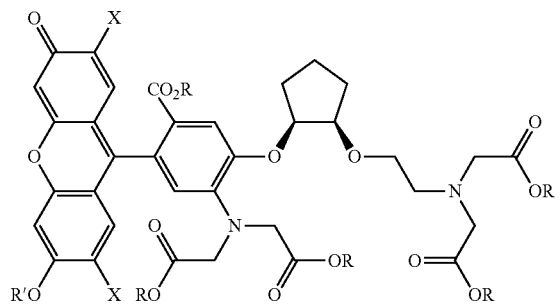

(IIIC)

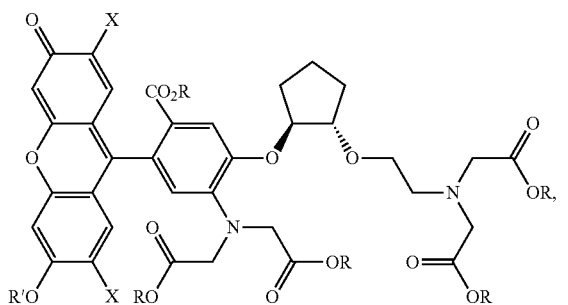

(IIIB)

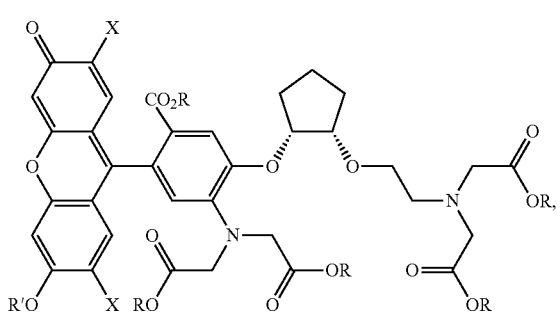

(IIID)

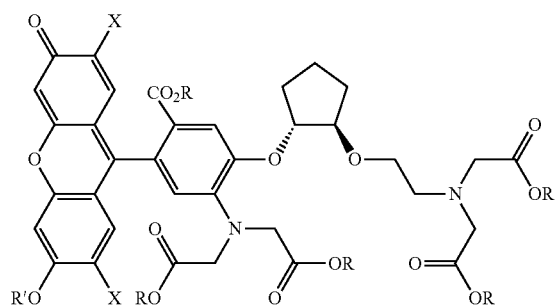

where:
each R independently represents H, —Ac, —CH$_2$OAc, or a counter cation;
R' is H, —Ac, —CH$_2$OAc, or a counter cation; and
each X independently represent H, F, Br, or Cl.

In some aspects of the present disclosure, the Compound (IIIA) can exist in the following tautomeric forms:

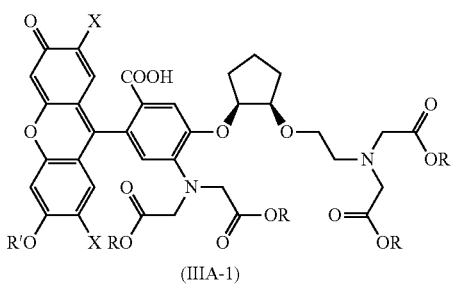
(IIIA-1)

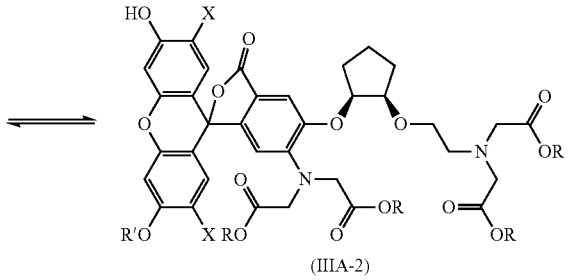
(IIIA-2)

each R independently represents H, —Ac, —CH$_2$OAc, or a counter cation;
R' is H, —Ac, —CH$_2$OAc, or a counter cation; and
each X independently represent H, F, Br, or Cl.

In some aspects of the present disclosure, the Compound (IIIB) can exist in the following tautomeric forms:

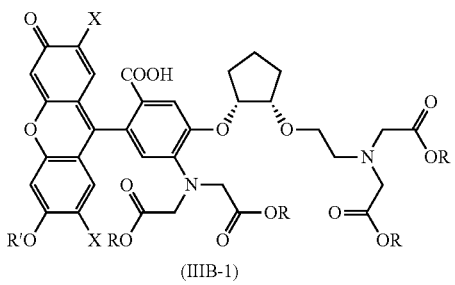
(IIIB-1)

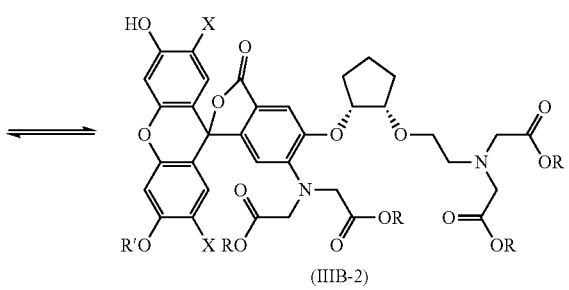
(IIIB-2)

each R independently represents H, —Ac, —CH₂OAc, or a counter cation;
R' is H, —Ac, —CH₂OAc, or a counter cation; and
each X independently represent H, F, Br, or Cl.

In some aspects of the present disclosure, the Compound (IIIC) can exist in the following tautomeric forms:

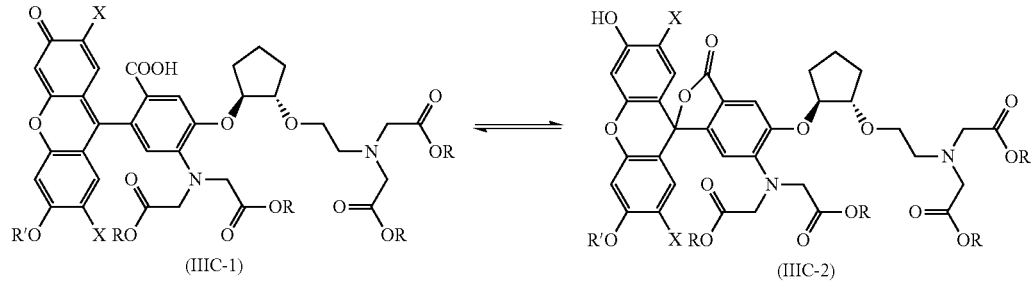

each R independently represents H, —Ac, —CH₂OAc, or a counter cation;
R' is H, —Ac, —CH₂OAc, or a counter cation; and
each X independently represent H, F, Br, or Cl.

In some aspects of the present disclosure, the Compound (IIID) can exist in the following tautomeric forms:

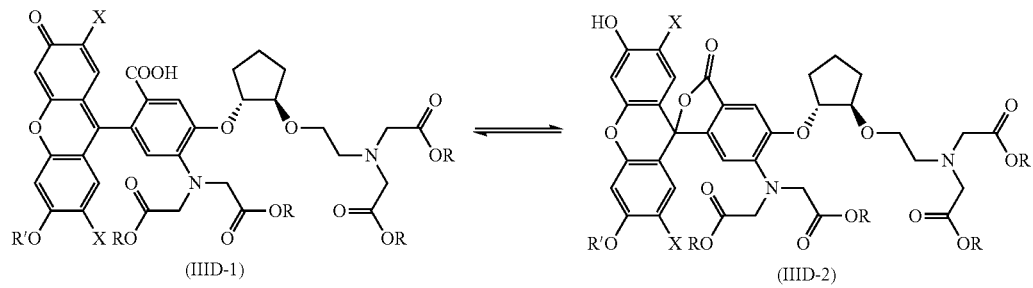

each R independently represents H, —Ac, —CH₂OAc, or a counter cation;
R' is H, —Ac, —CH₂OAc, or a counter cation; and
each X independently represent H, F, Br, or Cl.

In some aspects to the present disclosure, R' is —Ac and X is F. In some aspects of the present disclosure. R' is —CH₂OAc and X is F. In some aspects of the present disclosure, R' is a counter cation and X is F.

Exemplary cations include ammonium salts or metal cations. Examples of ammonium salts include, but are not limited to Me₄N⁺ or H₄N⁺. Metal cations can include alkali metal cations or alkaline earth metal cations. Examples of metal cations include, but are not limited to, K⁺ or Na⁺.

Specific examples of the compounds of the present disclosure include compounds, (IIA-3/IIB-3) and (IIIA-3/IIIB-3):

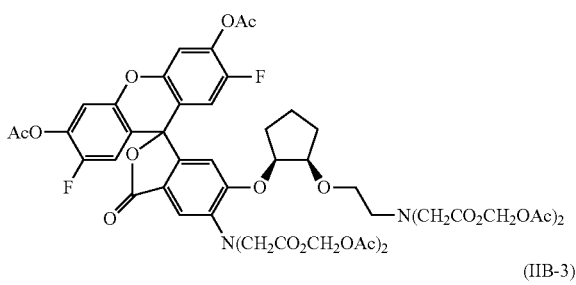

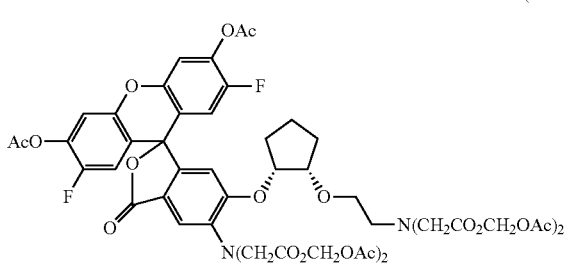

-continued
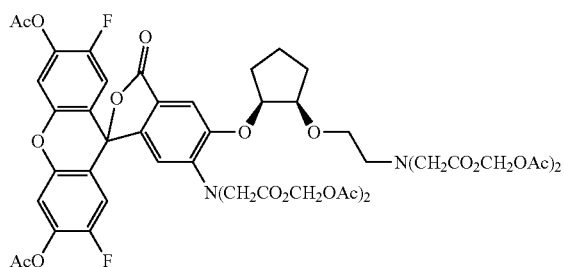
(IIIA-3)
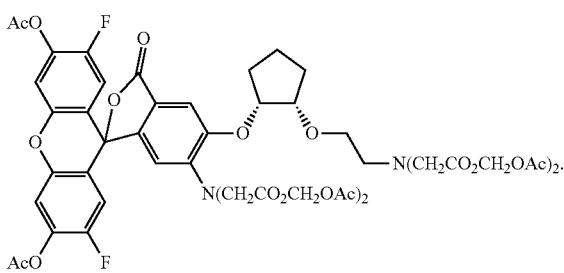
(IIIB-3)
Specific examples of the compounds of the present disclosure include compounds, (IIA-4/IIB-4) and (IIIA-4/IIIB-4) or a salt thereof:
(IIA-4)
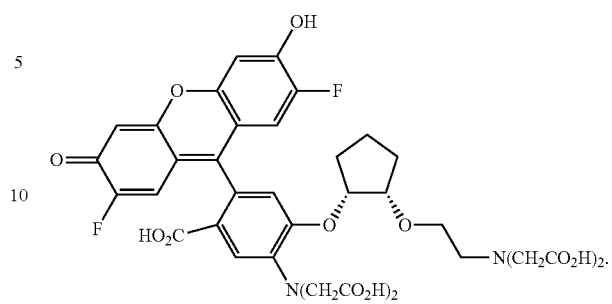
(IIB-4)
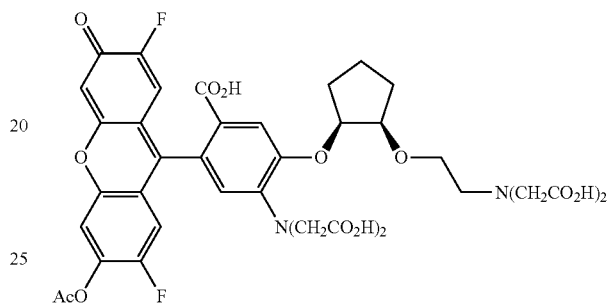
(IIIA-4)
(IIIB-4)
Synthesis of Compound IIA/B-5 and IIIA/B-578
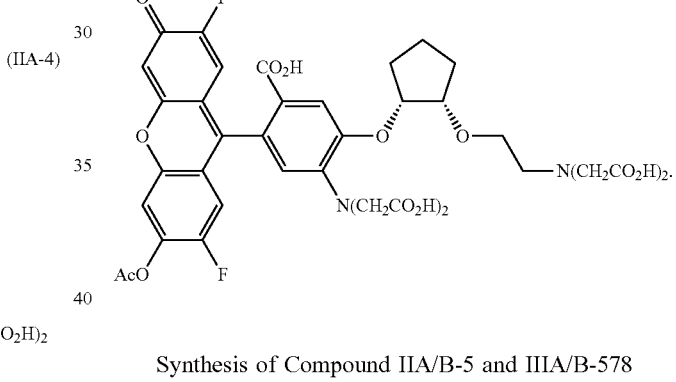
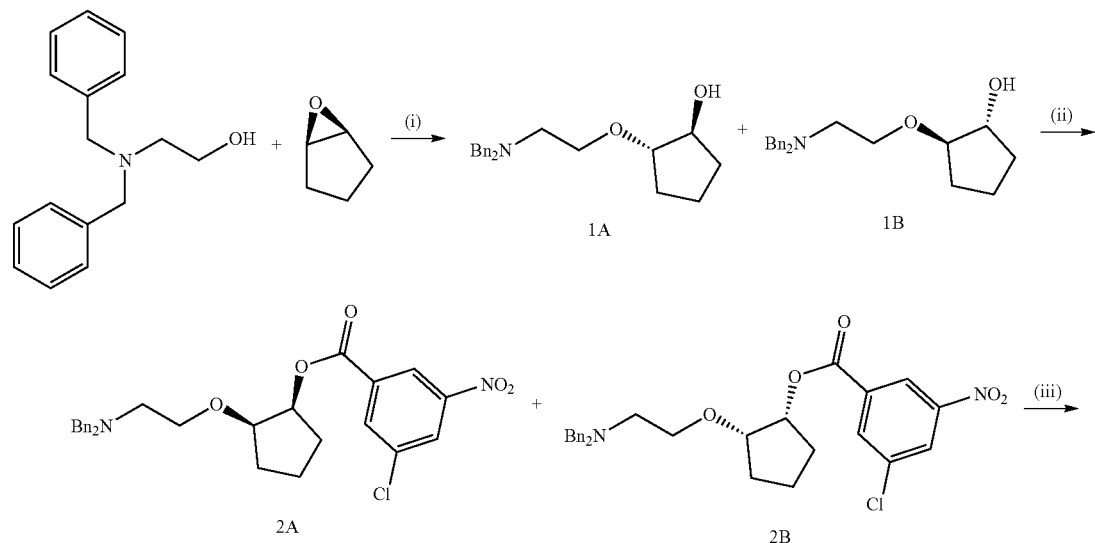

-continued
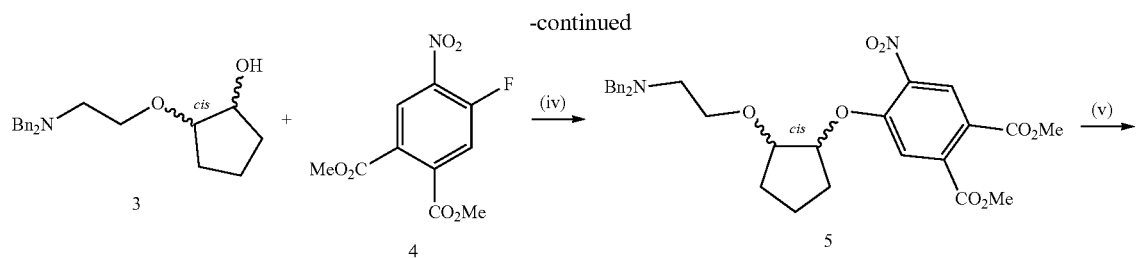
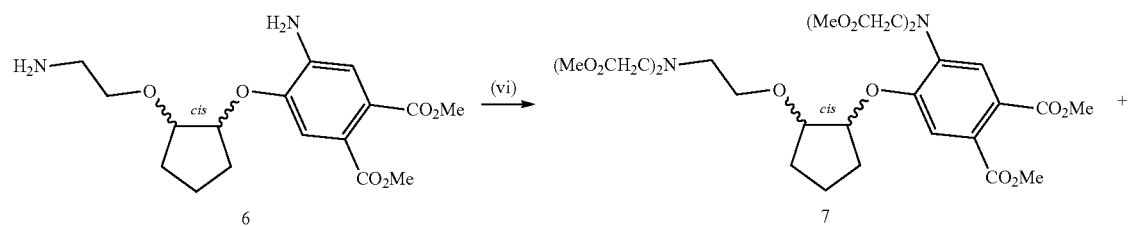
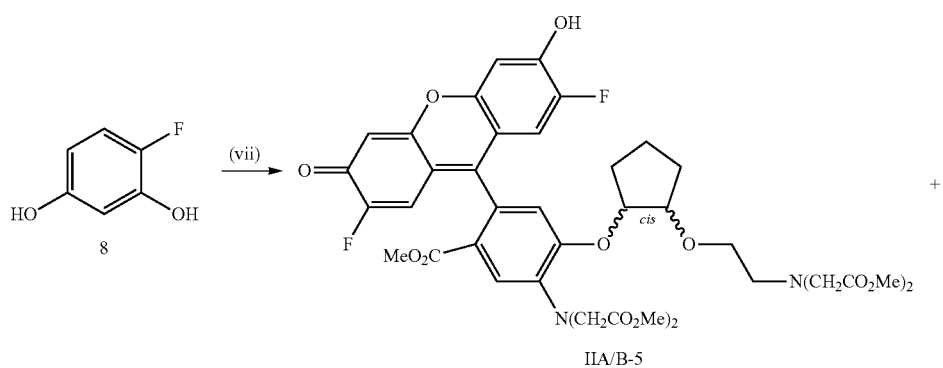
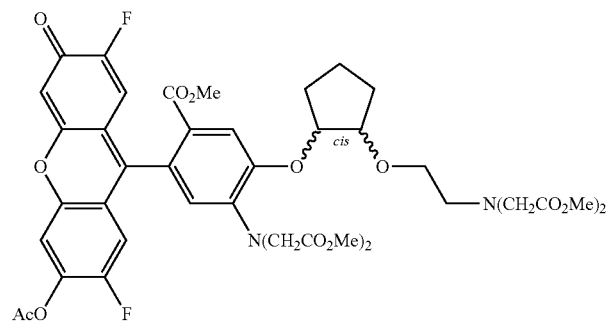
IIIA/B-5
(i) NaH, DMF, 80 C; (ii) 3-Cl-5-NO$_2$benzoic acid, DIAD, PPh3, THF; (iii) dioxane, MeOH, 1M aq. KOH then 1M aq. HCl; (iv) NaH, THF; (v) 5% Pd/C/H$_2$, DCM; (vi) methyl bromoacetate, Na$_2$HPO$_4$, NaI, MeCN, 110° C.; (vii) methanesulfonic acid, 115° C. then MeOH, 80° C.

Synthesis of Compound IIA/B-4
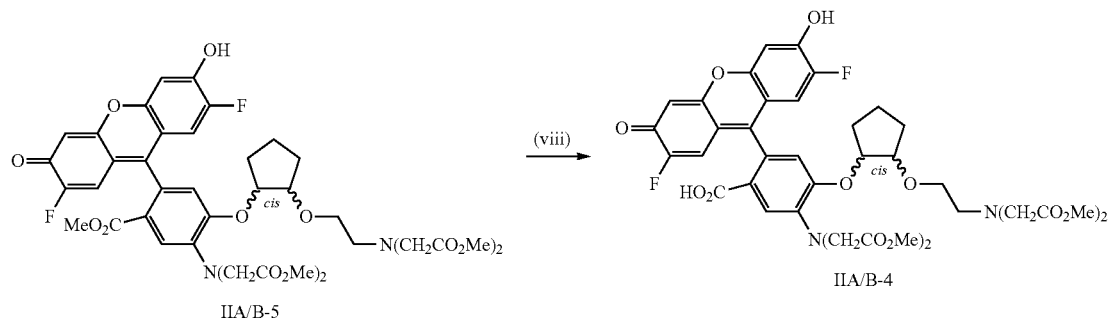
IIA/B-5 → IIA/B-4
(viii) MeOH, 1M aq. KOH, then 1M aq. HCl.
Synthesis of Compound IIIA/B-4
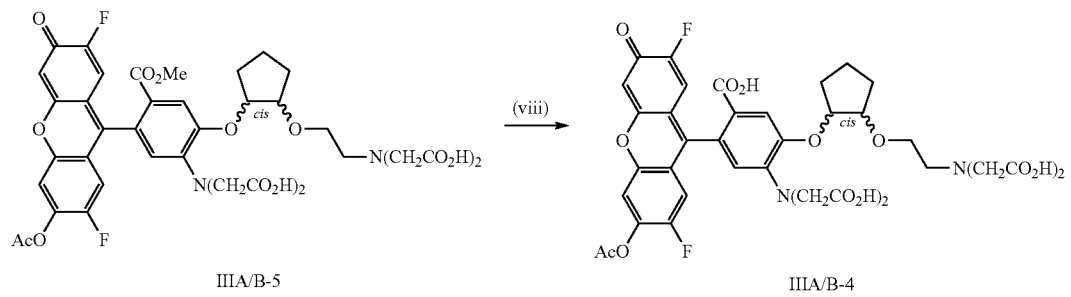
IIIA/B-5 → IIIA/B-4
(viii) MeOH, 1M aq. KOH, then 1M aq. HCl.
Synthesis of Compound IIA/B-3
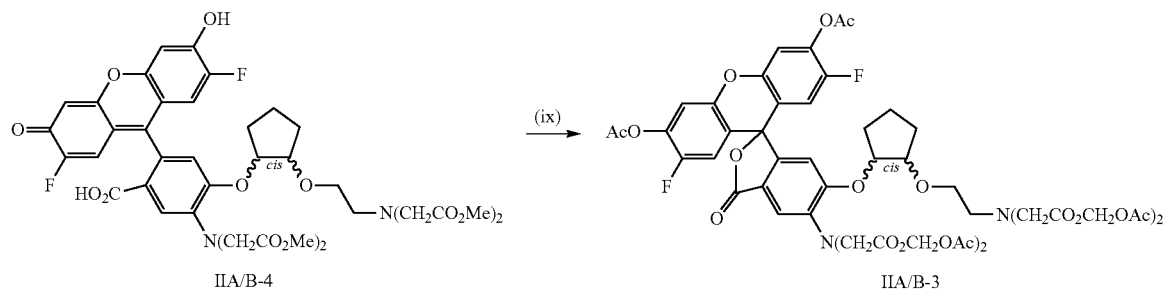
IIA/B-4 → IIA/B-3
(ix) Ac₂O, DIPEA, DMF then AMBr

Synthesis of Compound IIIA/B-3

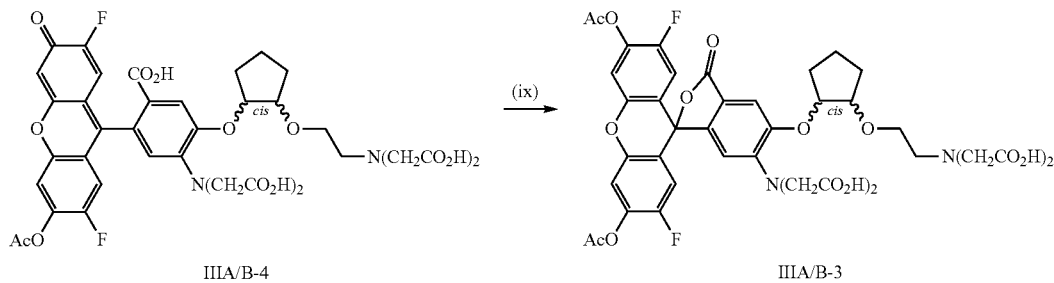

IIIA/B-4 → IIIA/B-3

(viii) Ac₂O, DIPEA, DMF then AMBr

The above synthetic scheme (Scheme 1) generates the cis-isomers of the calcium chelators described herein. The cis-isomers are derived from the Mitsunobu reaction on the trans intermediate products (Compounds 1A and 1B) of step 1. Synthesis of any of the trans-isomers of the calcium chelators described herein can therefore be prepared using a generalized sequence of the scheme above with steps (ii) and (iii) omitted.

Compounds 1: (1S,2S)-2-(2-(dibenzylamino)ethoxy) cyclopentan-1-ol (1A) and (1R,2R)-2-(2-(dibenzylamino)ethoxy)cyclopentan-1-ol (1B)

5 mL dry DMF were added to 2 g (8.3 mmol, 3.5 eq) 2-(dibenzylamino)ethan-1-ol and 300 mg (7.25 mmol, 3.2 eq) NaH in a vial under Argon atmosphere, and the reaction mixture was stirred for 30 minutes at room temperature, with intermittent sonication for 5 minutes. 200 µL (2.29 mmol, 1 eq) cyclopentene epoxide was added to the mixture, and the reaction was stirred at 80° C. for 20 hours. The reaction was diluted with 100 mL EtOAc and this solution was washed with pH 4 citrate buffer. The organic layer was dried over anhydrous sodium sulfate, filtered free of solids, and rotary evaporated at 40° C. yielding 1.6 g crude oil 1:1 N,N-dibenzyl-2-aminoethanol starting material to cyclopentyl product. The product was purified by silica column chromatography using a 5% to 20% EtOAc in chloroform gradient. Removal of solvents yielded 605 mg of both trans enantiomers of the desired product at 85% purity (67% TY), with mainly the diastereomers of the dimer of the product as impurities, along with some residual starting alcohol. $C_{21}H_{27}NO_2$ ¹H NMR (CDCl₃, 400 MHz) $\delta_H$ (ppm): 7.38 (br d, 4H, J=7.2 Hz); 7.32 (br t, 4H, J=7.4 Hz); 7.24 (br t, 2H, J=7 Hz); 4.00-4.08 (m, 1H); 3.68, (br s, 4H); 3.50-3.65 (m, 3H); 2.69 (dt, 2H, J=5.8 and 0.8 Hz); 2.58 (br s, 1H); 1.86-2.00 (m, 2H); 1.61-1.73 (m, 2H); 1.44-1.58 (m, 2H).

Compounds 2: (1R,2S)-2-(2-(dibenzylamino)ethoxy)cyclopentyl 3-chloro-5-nitrobenzoate (2A) and (1S,2R)-2-(2-(dibenzylamino)ethoxy)cyclopentyl 3-chloro-5-nitrobenzoate (2B) To a vial equipped with 2.28 g (7.00 mmol, 1 eq) of the trans enantiomers of compound 1, 1.03 g (27.85 mmol, 4 eq) triphenylphosphine, and 792 mg (27.84 mmol, 4 eq) 3-chloro-5-nitrobenzoic acid was added 10 mL dry THF under Argon atmosphere. The solution was stirred in an ice bath for 15 minutes, and 772 µL (28.00 mmol, 4 eq) DIAD was added at a rate of 300 µL every 1-2 minutes while maintaining the ice bath. After the addition was complete, the reaction was stirred for 5 hours without replenishing the ice bath. The reaction was diluted with 50 mL EtOAc and washed three times with 3M NaOAc buffer and once with brine. The organic layer was dried over sodium sulfate, filtered free of solids, and rotary evaporated at 40° C., followed by drying under vacuum. 80 mL diethyl ether were added to the gum, and this mixture was sonicated for 5 minutes. After 20 minutes, a large amount of white triphenylphosphonium oxide solid had developed. The mixture was again sonicated for 5 minutes. After 10 minutes, the solids were filtered from the mixture and rinsed 4 times with 20 mL diethyl ether each time. Solvents were removed from the filtrate by rotary evaporation at 40° C. The crude product was purified on ten 1 mm thick preparatory silica TLC plates, eluting with 15% EtOAc in hexanes. The product was extracted from silica with 75 mL EtOAc. The extracts were filtered free of solids, and solvents were removed by rotary evaporation at 40° C., followed by drying under vacuum to give 3 g (84% TY) of both enantiomers of the desired product. $C_{28}H_{29}ClN_2O_5$ Compounds 3: (1R,2S)-2-(2-(dibenzylamino) ethoxy)cyclopentan-1-ol (3A) and (1S,2R)-2-(2-(dibenzylamino)ethoxy)cyclopentan-1-ol (3B)

To a vial equipped with 3 g both cis enantiomers of compound 2 was added 15 mL of dioxane and MeOH. To this solution was added 15 mL 1M aq KOH. The reaction was stirred at room temperature for 1 hr and then cooled with ice chips. 2M HCl was added to adjust the pH of the reaction mixture to 8, and then dioxane and MeOH were removed by rotary evaporation at 40° C. The remaining aqueous mixture was extracted with three times with 50 mL EtOAc. The organic layer was subsequently washed with aq. sodium bicarbonate solution, dried over sodium sulfate, and filtered free of solids. Solvents were removed by rotary evaporation at 40° C. The product was purified by silica preparatory TLC, eluting with 3.5% MeOH in chloroform and extracting with EtOAc. The extracts were filtered free of solids, and solvents were removed by rotary evaporation at 40° C. Drying under vacuum yielded 1.63 g (85% TY based on Compound 2, 72% TY based on Compound 1) of the cis enantiomers of the desired product. $C_{21}H_{27}NO_2$ ¹H NMR (CDCl₃, 400 MHz) $\delta_H$ (ppm): 7.38 (br d, 4H, J=7.2 Hz); 7.32 (br t, 4H, J=7.4 Hz); 7.24 (br t, 2H, J=7.4 Hz); 4.00-4.07 (m, 1H); 3.67 (d, 2H, J=4.0 Hz); 3.65 (d, 2H, J=4.0 Hz); 3.59-3.68 (m, 2H); 3.44-3.54 (m, 1H); 2.61-2.76 (m, 2H); 2.38 (br s, 1H); 1.59-1.89 (m, 5H); 1.39-1.53 (m, 1H).

Compound 4: Dimethyl 4-fluoro-5-nitrophthalate

To a vial equipped with 1.09 g (3.99 mmol, 1 eq)) dimethyl 4-chloro-5-nitrophthalate and 1.6 g (10.53 mmol, 2.64 eq) CsF were added 5 mL dry MeCN. The vial cap was sealed with electrical tape, and the reaction mixture was stirred at 100° C. for 6 hours. After cooling to room temperature, the reaction mixture was diluted with 50 mL EtOAc and washed twice with aq sodium bicarbonate solution to remove phenol contaminant and once with brine. The organic layer was dried over sodium sulfate, filtered free of solids, and rotary evaporated at 40° C. Drying under vacuum yielded 670 mg (2.61 mmol, 65% TY) of the desired product. $C_{10}H_8FNO_6$ $^1H$ NMR (CDCl$_3$, 400 MHz) $\delta_H$ (ppm): 8.54 (br d, 1H, J=6.4 Hz); 7.55 (br d, 1H, 10 Hz); 3.96 (s, 3H).

Compounds 5: Dimethyl 4-(((1S,2R)-2-(2-(dibenzylamino)ethoxy)cyclopentyl)oxy)-5-nitro phthalate (5A) and dimethyl 4-(((1R,2S)-2-(2-(dibenzylamino)ethoxy)cyclopentyl)oxy)-5-nitro phthalate (5B)

3 mL dry THF were added to a vial equipped with 206 mg (0.63 mmol, 1 eq) of both cis enantiomers of Compound 4 and 33 mg (0.82 mmol, 1.31 eq) NaH under argon atmosphere. The reaction mixture was stirred and sonicated for 15 minutes total at 23° C. A solution of 157 mg (0.61 mmol, 1 eq) dimethyl 4-fluoro-5-nitrophthalate in 1 mL THF was added to the reaction mixture, which then stirred for 16 hours at room temperature. The reaction was quenched by pouring it into 50 mL pH 4 citrate buffer over ice. The solid precipitate was filtered and purified by silica preparatory TLC, eluting with 15% EtOAc in chloroform, and extracting the product with EtOAc. The extracts were filtered free of solids and rotary evaporated at 40° C. Drying under vacuum yielded 134 mg (0.24 mmol, 39% TY) of the desired product. $C_{31}H_4N_2O_8$ Compounds 6: Dimethyl 4-amino-5-(((1S,2R)-2-(2-aminoethoxy)cyclopentyl)oxy)phthalate (6A) and dimethyl 4-amino-5-(((1R,2S)-2-(2-aminoethoxy)cyclopentyl)oxy) phthalate (6B).

To a solution of 134 mg (0.24 mmol, 1 eq) of both cis enantiomers of Compound 5 in 5 mL DCM was added 130 mg (0.061 mmol, 0.25 eq) 5% Pd on carbon. The reaction mixture was shaken under 72 psi hydrogen atmosphere for three hours. It was then filtered free of solids, and the filtrate was rotary evaporated at 40° C. Drying under vacuum yielded 105 mg (0.30 mmol, 125% TY) of the crude desired product, which was used without further purification. $C_{17}H_{24}N_2O_6$.

Compounds 7: dimethyl3-(bis(2-methoxy-2-oxoethyl)amino)-4-(((1S,2R)-2-(2-(bis(2-methoxy-2-oxoethyl)amino)ethoxy)cyclopentyl)oxy)phthalate (7A) and dimethyl3-(bis(2-methoxy-2-oxoethyl) amino)-4-(((1R,2S)-2-(2-(bis(2-methoxy-2-oxoethyl) amino)ethoxy)cyclopentyl)oxy) phthalate (7B)

A reaction mixture of 656 mg (1.86 mmol, 1 eq) of the cis enantiomers of compound 6, 122 mg (0.81 mmol, 0.44 eq) NaI, 1.55 mL (16.37 mmol, 8.8 eq) methylbromoacetate, and 1.17 g (8.24 mmol, 4.43 eq) sodium monohydrogenphosphate in 10 mL MeCN in a vial sealed with electrical tape was stirred at 110° C. for 3 days. After cooling to room temperature, the reaction mixture was diluted in 100 mL ethyl acetate and washed twice with pH 4 citrate buffer and once with brine. The organic layer was dried over sodium sulfate, filtered free of solids, and rotary evaporated at 40° C. After drying under vacuum, the gum was purified by silica preparatory TLC, eluting twice with 3:2 EtOAc/hexanes and extracting from silica with EtOAc. The extracts were filtered free of solids and rotary evaporated at 40° C. Drying under vacuum yielded 243 mg (0.38 mmol, 20.4% TY), of the desired product. $C_{29}H_{40}N_2O_{14}$ Compounds IIA/B-5 and IIIA/B-5

The contents in a vial consisting of 240 mg (0.37 mmol, 1 eq) of both cis enantiomers of Compound 7, 480 mg (3.75 mmol, 10 eq), 4-fluororesorcinol (8), and 2.4 mL methanesulfonic acid was stirred at 115° C. for 30 minutes. After the reaction mixture cooled to room temperature, it was diluted with 24 mL MeOH. This solution was stirred at reflux for 3 hours. After cooling to room temperature, the reaction mixture was poured over 100 cc crushed ice, and the pH of the aqueous mixture was adjusted to 4 with 1M aq KOH. The precipitated solids were filtered, rinsed with dI water, and air dried, yielding 240 mg of the mixture of structural isomers IIA/B-5 and IIIA/B-5. This pentamethyl ester solid was dissolved in 24 mL 3:2 MeCN/water and purified by preparatory HPLC on a C18 column, with a 30-70% MeOH+0.1% formic acid in water+0.1% formic acid gradient. Fractions containing both structural isomers (IIA/B-5 and IIIA/B-5) of product were combined and rotary evaporated at 40° C., followed by drying under vacuum to yield 130 mg. These were purified further by silica preparatory TLC—eluting three times with 10% MeOH in chloroform and extracting the product from silica with 20% MeOH in chloroform. A band was collected for each isomer. The extracts for each band were filtered free of solids, rotary evaporated, and dried under vacuum. Each partially-purified isomer was individually purified once more by silica preparatory TLC, this time eluting 3 times with 11% MeOH in chloroform and extracting each product band from silica with 20% MeOH in chloroform. The extracts from each band were filtered free of solids, rotary evaporated at 40° C., and dried under vacuum to provide 50 mg (0.060 mmol, 16% TY) of both cis enantiomers of each structural isomer (32% total TY) of product. $C_{40}H_{42}F_2N_2O_{15}$ Compound IIA/B-5: R=Me, R'=H, X=F $^1H$ NMR (d$_4$-MeOH, 400 MHz) $\delta_H$ (ppm): 7.66 (s, 1H); 6.98 (s, 1H); 6.83 (d, 2H, J=3.6 Hz); 6.80 (d, 2H, J=8 Hz); 4.77-4.83 (m, 1H); 4.43 (d, 2H, J=18.4 Hz); 4.29 (d, 2H, J=18.4 Hz); 3.84-3.94 (m, 1H); 3.79 (s, 6H); 3.63 (s, 6H); 3.59-3.62 (m, 1H); 3.56-3.69 (s, 3H); 3.54 (d, 2H, J=18 Hz); 3.49 (d, 2H, J=17.6 Hz); 3.40-3.47 (m, 1H); 2.77-2.91 (m, 2H); 1.84-2.00 (m, 2H); 1.80-1.91 (m, 1H); 1.73-1.80 (m, 2H); 1.47-1.65 (m, 2H).

Compound IIA/B-4

Compound IIA/B-4: 50 mg (0.060 mmol, 1 eq) of both cis isomers of each structural isomer of Compound IIA/B-5 were dissolved in 2 mL MeOH, and 0.5 mL (0.50 mmol, 8.3 eq) of 1M aq KOH were added. The reaction was stirred at 40° C. for 16 hours. Crushed ice was added, and the reaction mixture pH was adjusted to 8-9 with 1M aq HCl. This solution purified by LH20 column chromatography, eluting with dI water, and product fractions were combined and lyophilized. The lyophilized solid was dissolved in dI water, and submitted to another LH20 column. Pure product fractions were combined and lyophilized again. The solid was dissolved in dI water, and crushed ice was added. The pH was adjusted to 2 with 1.0 M aq HCl, and the precipitated free acid product was filtered and rinsed with dI water. It air-dried overnight to give 34 mg (0.045 mmol, 75% TY) of the desired product. $C_{35}H_{32}F_2N_2O_{15}$.

Compound IIIA/B-4

Compound IIIA/B-4 was synthesized in a similar manner to Compound IIA/B-4 starting from 50 mg (0.060 mmol, 1 eq) Compound IIIA/B-5 and yielding 23 mg (0.030 mmol, 50% TY) of the desired product. $C_{35}H_{32}F_2N_2O_{15}$

Compound IIA/B-3

Compound IIA/B-3: Bis(acetoxymethyl)2,2'-((3',6'-diacetoxy-5-(((1R,2S)-2-(2-(bis(2-(acetoxymethoxy)-2-oxoethyl)amino)ethoxy)cyclopentyl)oxy)-2',7'-difluoro-3-oxo-3',4',4a',9a'-tetrahydro-3H-spiro[isobenzofuran-1,9'-xanthen]-6-yl)azanediyl)diacetate (IIA-3) and bis(acetoxymethyl) and 2,2'-((3',6'-diacetoxy-5-(((1S,2R)-2-(2-(bis(2-(acetoxymethoxy)-2-oxoethyl)amino)ethoxy)cyclopentyl)oxy)-2',7'-difluoro-3-oxo-3',4',4a',9a'-tetrahydro-3H-spiro[isobenzofuran-1,9'-xanthen]-6-yl)azanediyl]diacetate (IIB-3). 33 mg (0.043 mmol, 1 eq) of both enantiomers of compound IIA/B-4 were dissolved in 0.5 mL dry DMF in a capped vial. 100 µL (0.574 mmol, 13 eq) DIPEA, followed by 7.4 µL (0.078 mmol, 1.8 eq) acetic anhydride, were added. The reaction stirred at room temperature for 30 minutes. 27.4 µL (0.29 mmol, 6.6 eq) bromomethyl acetate were then added, and the reaction continued stirring for 1 hour. The reaction mixture was diluted with 50 mL EtOAc and washed twice with pH 4 citrate buffer followed by once with brine. The organic layer was dried over sodium sulfate, filtered free of solids, and rotary evaporated at 40° C., followed by drying under vacuum. The crude product was dissolved in 12 mL 2:1 MeCN/water and purified by preparatory HPLC, with a 5-95% MeCN+0.1% formic acid in water+0.1% formic acid gradient through a C18 column. Pure fractions were combined and lyophilized to yield 25 mg (0.022 mmol, 51% TY) of the desired product. $^1$H NMR (CDCl$_3$, 600 MHz) $\delta_H$ (ppm): 7.27 (s, 1H); 7.11 (d, 1H, J=2.4 Hz); 7.10 (d, 1H, J=2.4 Hz); 6.73 (d, 1H, J=10.2 Hz); 6.63 (d, 1H, J=9.6 Hz); 6.53 (s, 1H); 5.82 (s, 4H); 5.72 (d, 2H, J=6.0 Hz); 5.70 (d, 2H, J=6.0 Hz); 4.56-4.63 (m, 1H); 4.39 (d, 2H, J=18.6 Hz); 4.28 (d, 2H, J=18.6 Hz); 3.70-3.78 (m, 1H); 3.60 (d, 2H, J=18 Hz); 3.52 (d, 2H, J=18 Hz); 3.46-3.52 (m, 1H); 3.30-3.36 (m, 1H); 2.74-2.86 (m, 2H); 2.35 (s, 6H); 2.15 (s, 6H); 2.09 (s, 6H); 1.81-1.90 (m, 2H); 1.70-1.81 (m, 2H); 1.46-1.54 (m, 2H). HRMS (+HESI/LTQ FTMS) m/z: [M+H]$^+$ $C_{51}H_{53}F_2N_2O_{25}{}^+$ calc. 1131.2900, found 1131.2912, [M+Na]$^+$ $C_{51}H_{52}F_2N_2NaO_{25}$ calculated 1153.2725, observed 1153.2722, [M+K]$^+$ $C_{51}H_{52}F_2KN_2O_{25}$ calculated 1169.2464, observed 1169.2462.

Compound IIIA/B-3

Compound IIIA/B-3 was synthesized in a similar manner to Compound IIA/B-3. 23 mg (0.030 mmol, 1 eq), 50 µL (0.29 mmol, 9.5 eq) DIPEA, 4.5 µL Ac$_2$O (0.048 mmol, 1.6 eq) in 0.8 mL DMF in a capped vial were stirred at 23° C. for 40 min. 29 µL (0.30 mmol, 10 eq) AMBr were added, and the reaction stirred for 1 hour. Workup of the reaction and purification as for Compound IIA/B-3 yielded 13 mg (0.011 mmol, 31% TY) of the desired product. $^1$H NMR (CDCl$_3$, 600 MHz)$^{6H}$ (ppm): 7.37 (s, 1H); 7.11 (dd, 2H, dd, J=6.6 Hz and 1.2 Hz); 6.69 (d, 1H, J=10.2 Hz); 6.61 (d, 1H, J=9.6 Hz); 6.40 (s, 1H); 5.70-5.74 (m, 4H); 5.64-5.68 (m, 4H); 4.74-4.80 (m, 1H); 4.36 (d, 2H, J=18.6 Hz); 4.20 (d, 2H, J=18.6 Hz); 3.96-4.02 (m, 1H); 3.67 (d, 2H, J=18.0 Hz); 3.63 (d, 2H, J=18.0 Hz); 3.60-3.64 (m, 1H); 3.54-3.60 (m, 1H); 2.97-3.02 (m, 1H); 2.88-2.95 (m, 1H); 2.34 (d, 6H, J=1.8 Hz); 2.10 (s, 6H); 2.05 (s, 6H); 1.92-2.00 (m, 2H); 1.80-1.90 (m, 2H); 1.58-1.68 (m, 2H). HRMS (+HESI/LTQ FTMS) m/z: [M+H]$^+$ $C_{51}H_{53}F_2N_2O_{25}{}^+$ calc. 1131.2900, found 1131.2909, [M+Na]$^+$ $C_{51}H_{52}F_2N_2NaO_{25}$ calculated 1153.2725, observed 1153.2716.

Testing

Figure 2:
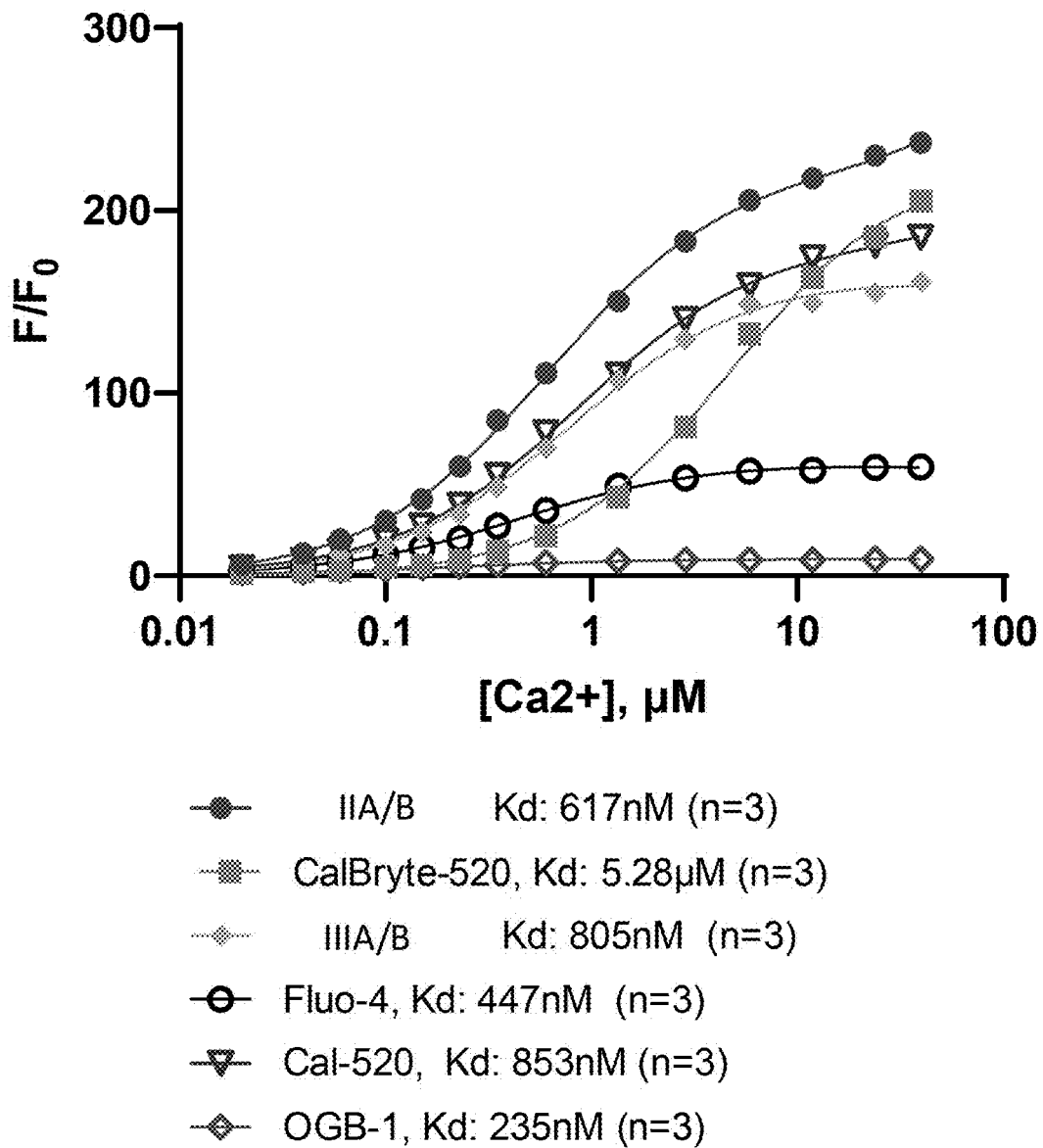
FIG. 2 depicts a $Ca^{2+}$ titration curve of the normalized fluorescence of the $Ca^{2+}$ fluorescent indicator IIA/B and IIIA/B (R=K$^+$, X=F), of the present invention, to commercial fluorescent calcium indicators at $Ca^{2+}$ concentrations of 0.01 to 100 PM.
Figure 3:
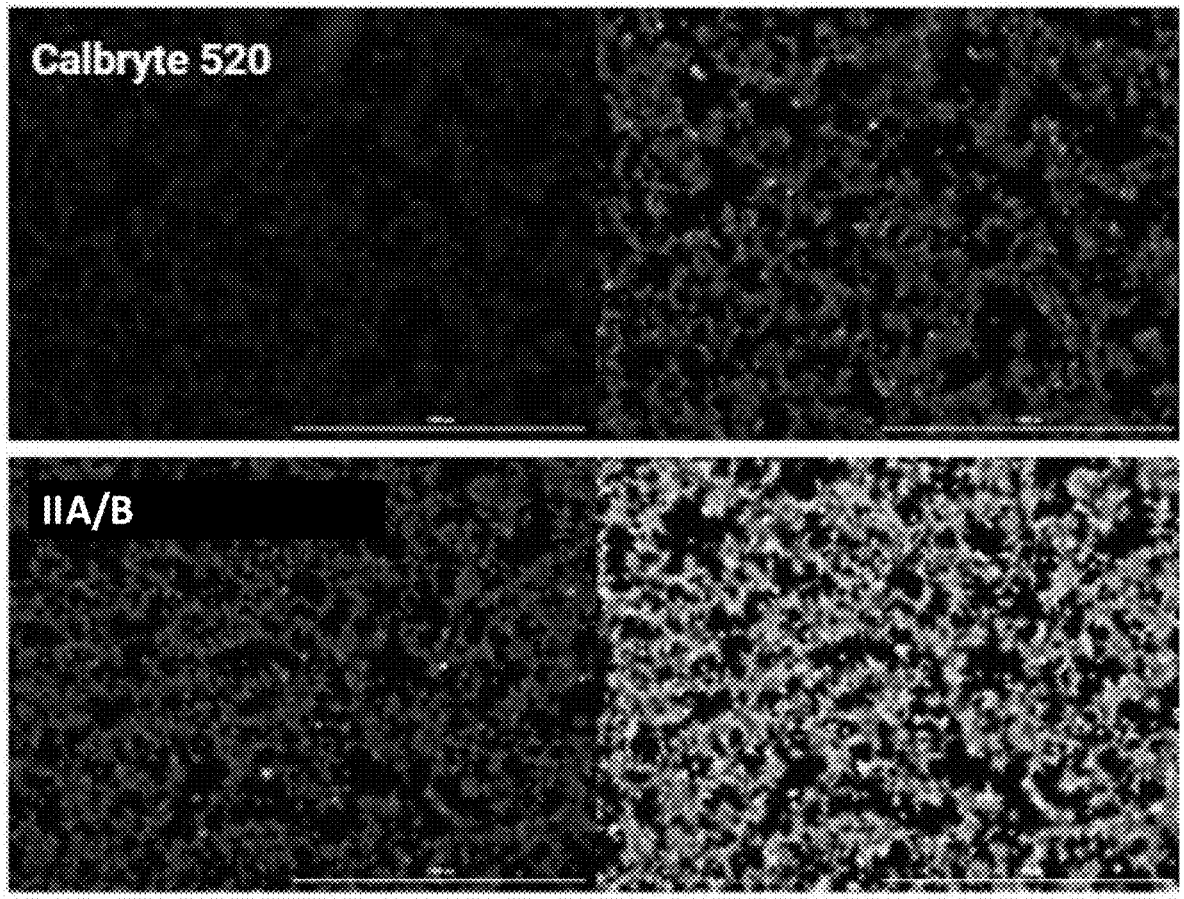
FIG. 3 depicts a comparison of efficacy of IIA/B and IIIA/B (X=F) to Calbryte 520 AM in the HEK293 muscarinic receptor assay using (−/+) carbachol.
Figure 4:
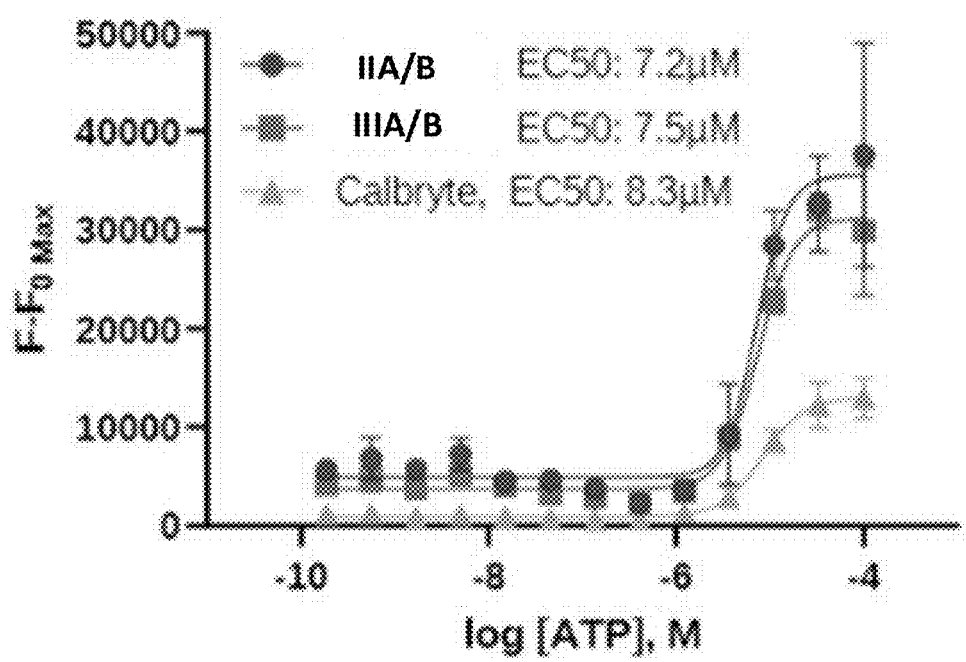
FIG. 4 depicts a comparison of the efficacy of IIA/B and IIIA/B (X=F) to Calbryte 520 AM in the CHO-K1 purinergic receptor assay using ATP.

The Ca$^{2+}$ binding ability of IIA/B-4 and IIIA/B-4 were compared to commercially known Ca$^{2+}$ binding fluorescent indicators. IIA/B-4 and IIIA/B-4 were tested against CalBryte-520, Fluo-4, Cal-520, and OGB-1. None of the commercially known Ca$^{2+}$ fluorescent indicators include a cyclopentyl group in the Ca$^{2+}$ binding portion of the molecule. Normalized fluorescence of the fluorescent indicators was determined with increasing concentrations of Ca$^{2+}$ ions. FIG. 1 shows the results of titration from 0 to 50 µM Ca$^{2+}$. FIG. 2 shows the results of titration from 0 µM Ca$^{2+}$ to 50 µM Ca$^{2+}$. In both tests, IIA-4-(cis) exhibited a larger response than any other calcium indicator evaluated and had a significantly higher affinity than CalBryte-520.

The $K_d$ values were determined for each of the tested fluorescent indicators. The results of the calculations are presented in Table 1 below:

TABLE 1

| Dye | Literature $K_d$ (nM) | Measured $K_d$ (nM) |
| --- | --- | --- |
| (IIA-4)/(IIIA-4) | N/A | 617 (IIA-4) |
|  |  | 805 (IIIA-4) |
| Calbryte | 1200 | 5280 |
| Fluo-4 | 355 | 447 |
| Cal-520 | 320 | 853 |
| OGB-1 | 170 | 235 |

Cell Based Assays

CHO K1 or HEK293 cells were cultured following standard protocols. Cells were plated 24 hrs prior to dye loading in a 384-well plate and cultured in an incubator overnight. Media was removed and cells were loaded with a buffered solution containing dye (IIA/B-3, IIIA/B-3, CalBryte-520, Fluo-4, Cal-520, and OGB-1), and in some embodiments, additional reagents such as pluronic F-127, probenecid, and an extracellular quencher dye for up to 1 hour. Kinetic fluorescence data was acquired using a high throughput screening instrument. Data are reported as $F_{max}-F_0$, where $F_{max}$ is the peak intensity after drug addition and $F_0$ is the baseline fluorescence prior to drug addition. Data obtained from these experiments is presented in the Figures.

What is claimed is:

1. A compound with the chemical structure (I), or a salt thereof:

(I)

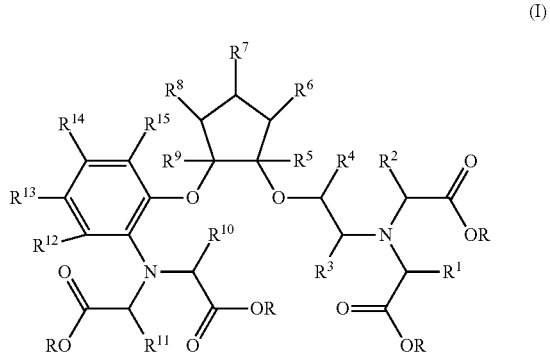

wherein:

R is H, an ammonium salt, a metal cation, an alkyl having 1-10 carbons, —Ac, or —CH$_2$OAc;

$R^1$-$R^{11}$ are independently H, a halogen, an alkyl, an aryl or a heteroaryl; and $R^{12}$-$R^{15}$ are independently H, an alkyl, a halogen, carboxy, carboxyalkylester, carboxyamide, an acyloxymethylcarbonyl, an alkoxy, an aryloxy, a thiol, an alkylthiol, an arylthiol, an azido, a nitro, a nitroso, a cyano, an amino, a hydroxy, a phosphonyl, a sulfonyl, a sulfonamide, a carbonyl, a boronyl, an aryl, a heteroaryl, a heterocycle or a fluorophore moiety.

2. The compound of claim 1, wherein the compound has the chemical structure (IA), (IB), (IC), (ID), or a salt thereof:

(IA)
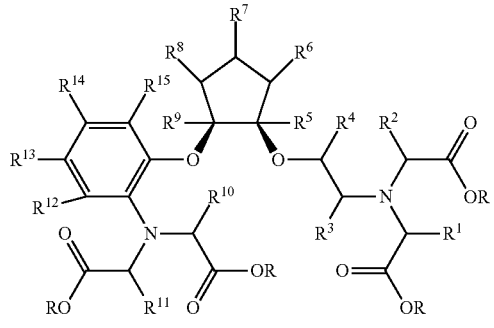

(IB)
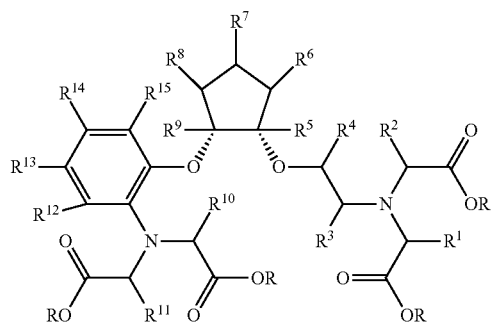

(IC)
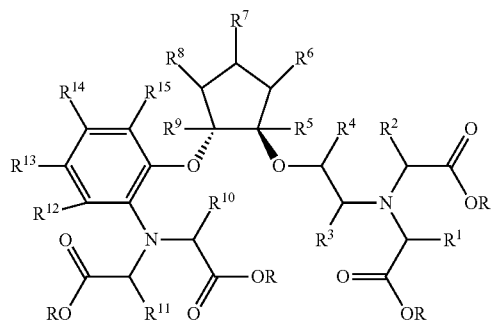

(ID)
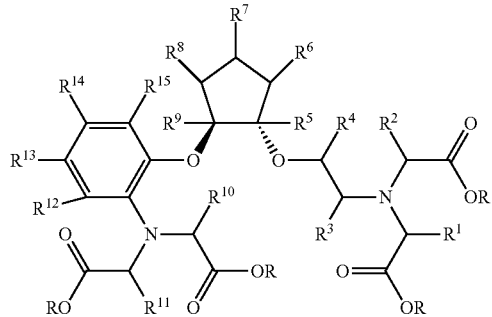

wherein $R^1$ to $R^{15}$ and R are the same as defined in claim 1.

3. The compound of claim 1, wherein at least one of $R^{12}$-$R^{15}$ is a fluorophore moiety or any two of $R^{12}$-$R^{15}$ are cyclically linked together to define a fluorophore moiety comprising a benzo-fused aryl, heteroaryl or heterocycle ring.

4. The compound of claim 3, wherein the fluorophore moiety is selected from an acridine, an acridone, an anthracene, a benzoisothiazole, a bodipy, a carbazole, a carboline, a coumarin, a chromone, a cyanine, a europium complex, a fluorene, a fluorescein, a furan, a furopyridine, a hemicyanine, an indole, an indoloquinolozine, an indolizine, an indolylidine, a naphthalimide, a naphthofluorescein, a naphthorhodamine, a naphthyridine, an oxadiazole, an oxatriazole, an oxazine, an oxazole, an oxazolopyridine, a perylenediimide, a phenanthroline, a phenazine, a phenothiazine, a phenoxazine, a phthalazine, a phthalocyanine, a pteridine, a purine, a pyranopyrrole, a pyrene, a pyridine, a pyridopyrimidine, a pyrimidine, a pyrylium, a quinoline, a quinolizine, a quinoxaline, a rhodamine, a rhodol, a ruthenium complex, a seminaphthofluorescein, a seminaphthorhodamine, a squaraine, a stirylpyridinium, a terbium complex, a thiadiazole, a thiazole, a thienopyridine, and a thiophene.

5. The compound of claim 3, wherein the fluorophore moiety is a xanthene fluorophore.

6. The compound of claim 3, wherein the fluorophore moiety is a fluorescein fluorophore or a rhodamine fluorophore.

7. The compound of claim 3, wherein the compound has the chemical structure (IIA), (IIB), (IIC), or (IID) or a salt thereof:

(IIA)
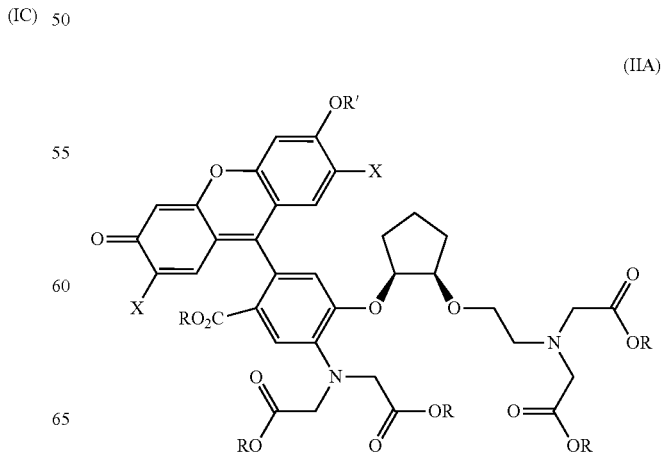

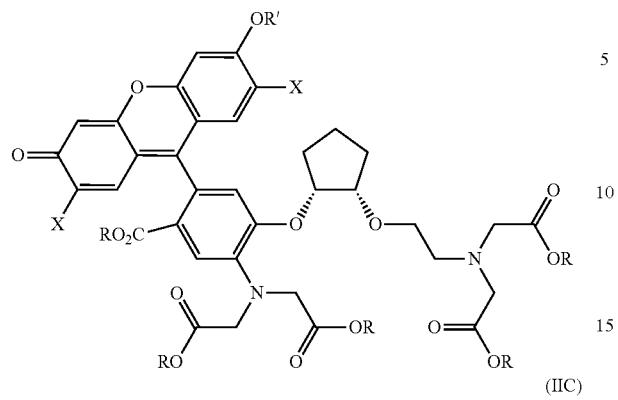

(IIB)

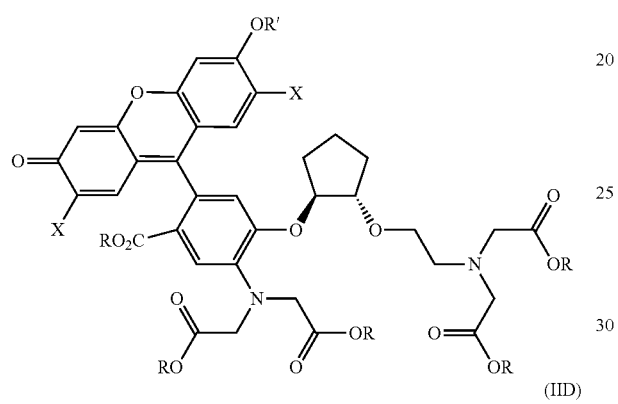

(IIC)

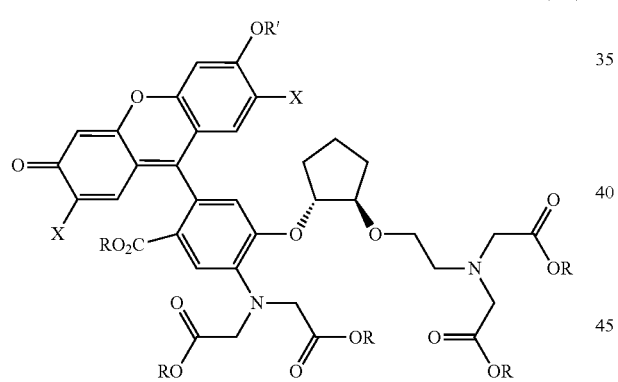

(IID)

where:
each R independently represents H, —Ac, —CH$_2$OAc, an ammonium salt, or a metal cation;
R' is H, —Ac, —CH$_2$OAc, an ammonium salt, or a metal cation; and
each X independently represents H, F, Br, or Cl;
wherein compounds (IIA), (IIB), (IIC), and (IID) can exist in their respective tautomeric forms.

8. The compound of claim 7, wherein R is —CH$_2$OAc and X is F.

9. The compound of claim 7, wherein R is an ammonium salt or a metal cation, and X is F.

10. The compound of claim 9, wherein R is an ammonium salt.

11. The compound of claim 9, wherein R is a metal cation.

12. The compound of claim 7, wherein the compound has the chemical structures:

(IIA-3)

(IIB-3)

13. The compound of claim 7, wherein the compound has the chemical structures, or salts thereof:

(IIA-4)

(IIB-4)

14. The compound of claim 3, wherein the compound has the chemical structure (IIIA), (IIIB), (IIIC), or (IIID), or a salt thereof:

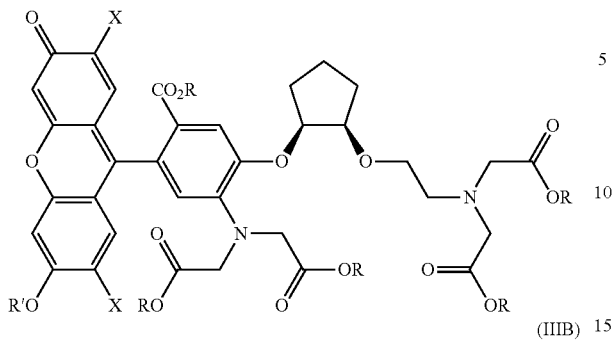

(IIIA)

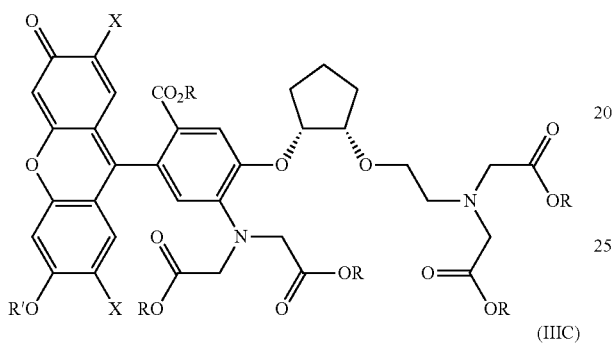

(IIIB)

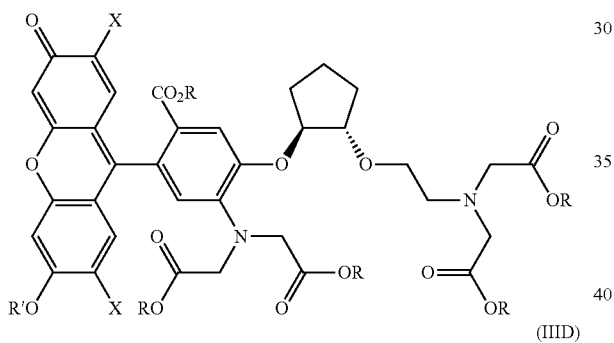

(IIIC)

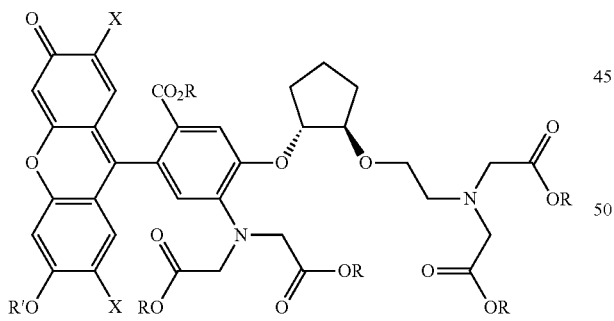

(IIID)

where:
  each R independently represents H, —Ac, —CH$_2$OAc, an ammonium salt, or a metal cation;
  R' is H, —Ac, —CH$_2$OAc, an ammonium salt, or a metal cation;
  each X independently represent H, F, Br, or Cl;
  wherein compound (IIIA), (IIIB), (IIIC), and (IIID) can exist in their corresponding tautomeric forms.

15. The compound of claim 14, wherein R is —CH$_2$OAc and X is F.

16. The compound of claim 14, wherein R is an ammonium salt or a metal cation and X is F.

17. The compound of claim 16, wherein R is an ammonium salt.

18. The compound of claim 16, wherein R is a metal cation.

19. The compound of claim 14, wherein the compound has the chemical structures:

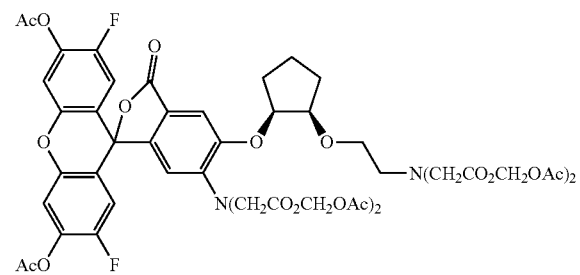

(IIIA-3)

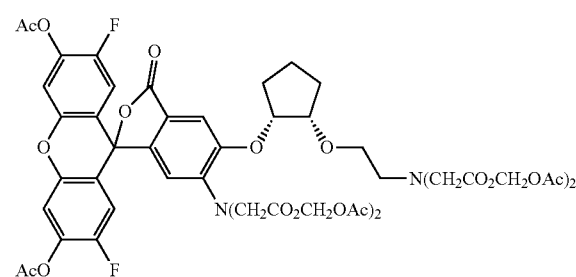

(IIIB-3)

or salts thereof.

20. The compound of claim 14, wherein the compound has the chemical structures:

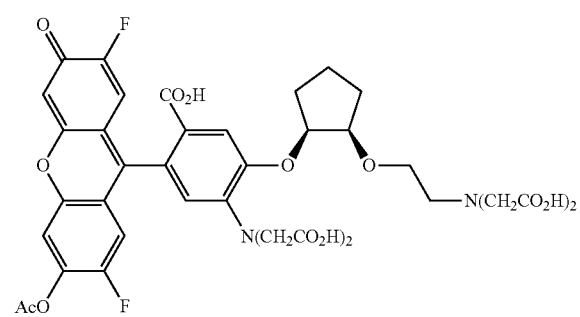

(IIIA-4)

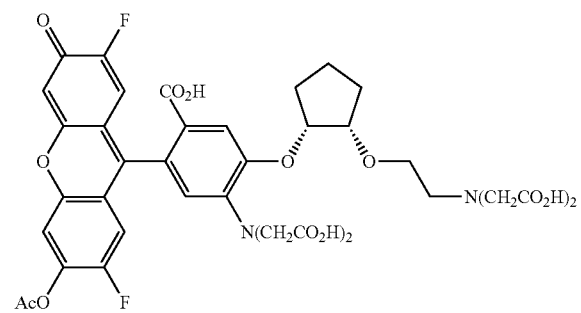

(IIIB-4)

or salts thereof.

21. A compound with the chemical structure (IA), (IB), (IC), (ID), or a salt thereof:

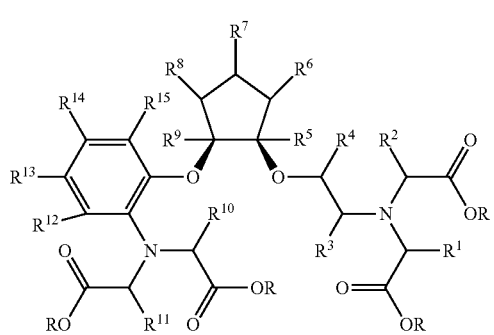

(IA)

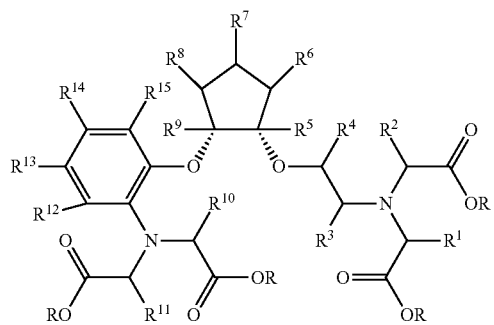

(IB)

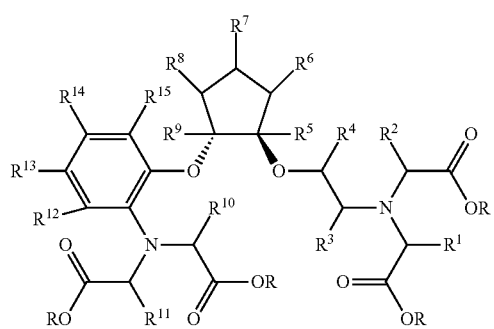

(IC)

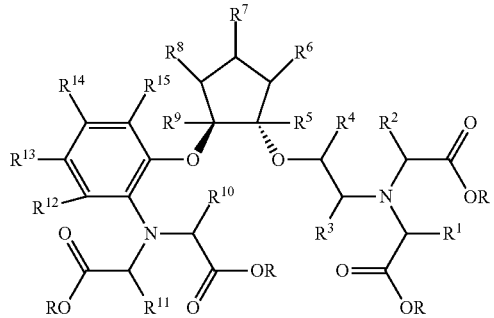

(ID)

wherein:
R is H, an ammonium salt, a metal cation, an alkyl having 1-10 carbons, —Ac, or —CH$_2$OAc;
$R^1$-$R^{11}$ are independently H, a halogen, an alkyl, an aryl or a heteroaryl; and
$R^{12}$-$R^{15}$ are independently H, an alkyl, a halogen, carboxy, carboxyalkylester, carboxyamide, an acyloxymethylcarbonyl, an alkoxy, an aryloxy, a thiol, an alkylthiol, an arylthiol, an azido, a nitro, a nitroso, a cyano, an amino, a hydroxy, a phosphonyl, a sulfonyl, a sulfonamide, a carbonyl, a boronyl, an aryl, a heteroaryl, a heterocycle or a fluorophore moiety.

22. The compound of claim 21, wherein:
each of $R^1$-$R^{11}$ is hydrogen;
$R^{13}$ or $R^{14}$ is a xanthene fluorophore;
$R^{13}$ or $R^{14}$ is hydrogen; and
each of $R^{12}$ and $R^{15}$ are hydrogen.

23. A compound with the chemical structure (IIA), (IIB), or a salt thereof:

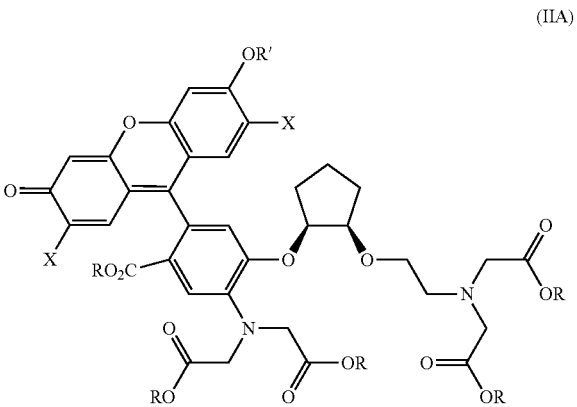

(IIA)

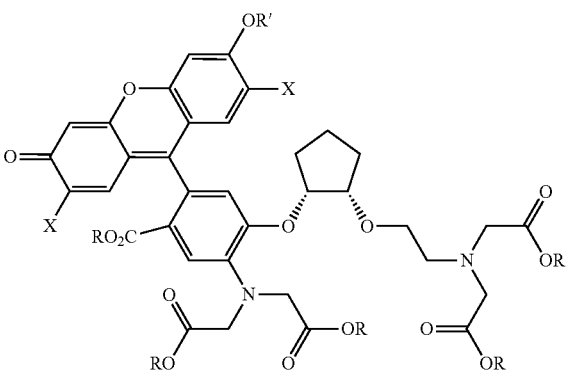

(IIB)

where:
each R independently represents H, —Ac, —CH$_2$OAc, an ammonium salt, or a metal cation;
R' is H, —Ac, —CH$_2$OAc, an ammonium salt, or a metal cation;
each X independently represent H, F, Br, or Cl;
wherein compound (IIA) and (IIB) can exist in their corresponding tautomeric forms.

24. The compound of claim 23, wherein R is —CH$_2$OAc and X is F.

25. The compound of claim 23, wherein R is an ammonium salt or a metal cation and X is F.

26. The compound of claim 23, wherein R is an ammonium salt or metal cation.

27. A compound with the chemical structure (IIIA), (IIIB), or a salt thereof:

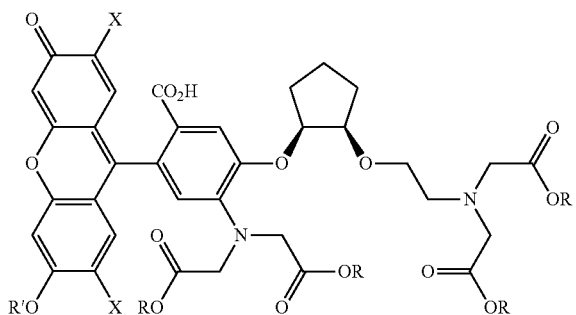

(IIIA)

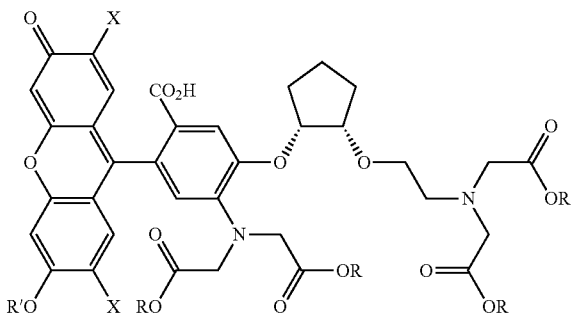

(IIIB)

where:
- each R independently represents H, —Ac, —CH$_2$OAc, an ammonium salt, or a metal cation;
- R' is H, —Ac, —CH$_2$OAc, an ammonium salt, or a metal cation;
- each X independently represent H, F, Br, or Cl;
- wherein compound (IIIA) and (IIIB) can exist in their corresponding tautomeric forms.

28. The compound of claim 27, wherein R is —CH$_2$OAc and X is F.

29. The compound of claim 27, wherein R is an ammonium salt, or a metal cation and X is F.

30. The compound of claim 27, wherein R is an ammonium salt or metal cation.

* * * * *